United States Patent
Zhou et al.

(10) Patent No.: US 11,889,423 B2
(45) Date of Patent: Jan. 30, 2024

(54) COMMUNICATION METHOD AND APPARATUS, AND COMPUTER-READABLE STORAGE MEDIUM

(71) Applicant: HUAWEI TECHNOLOGIES CO., LTD., Guangdong (CN)

(72) Inventors: Han Zhou, Shanghai (CN); Xiaolei Tie, Shanghai (CN); Zhanzhan Zhang, Shanghai (CN); Wenwen Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/680,049

(22) Filed: Feb. 24, 2022

(65) Prior Publication Data

US 2022/0279447 A1 Sep. 1, 2022

Related U.S. Application Data

(63) Continuation of application No. PCT/CN2020/076241, filed on Feb. 21, 2020.

(30) Foreign Application Priority Data

Aug. 30, 2019 (WO) ................ PCT/CN2019/103855

(51) Int. Cl.
*H04W 52/02* (2009.01)
*H04W 72/0446* (2023.01)
*H04W 72/23* (2023.01)

(52) U.S. Cl.
CPC .......... *H04W 52/0232* (2013.01); *H04W 72/0446* (2013.01); *H04W 72/23* (2023.01)

(58) Field of Classification Search
CPC .......... H04W 52/0232; H04W 72/042; H04W 72/0446; H04W 52/0216; H04W 52/0229;

(Continued)

(56) References Cited

U.S. PATENT DOCUMENTS

| | | | |
|---|---|---|---|
| 2019/0150114 A1* | 5/2019 | Liu | H04W 76/27 370/252 |
| 2020/0145921 A1* | 5/2020 | Zhang | H04W 24/08 |
| 2021/0045056 A1* | 2/2021 | Nam | H04W 52/0216 |

FOREIGN PATENT DOCUMENTS

| | | |
|---|---|---|
| CN | 109314972 A | 2/2019 |
| CN | 109923904 A | 6/2019 |

(Continued)

OTHER PUBLICATIONS

3GPP TS 38.212 V15.6.0 (Jun. 2019), "3rd Generation Partnership Project; Technical Specification Group Radio Access Network; NR; Multiplexing and channel coding (Release 15)," Jun. 2019, 101 pages.

(Continued)

*Primary Examiner* — Mang Hang Yeung
(74) *Attorney, Agent, or Firm* — Fish & Richardson P.C.

(57) ABSTRACT

Embodiments of the present invention provide a communication method and apparatus, and a computer-readable storage medium, to resolve a prior-art problem that data sending or data receiving of a terminal device is delayed. The method includes: if no monitoring occasion of a wake-up signal exists in a first time window, or a first time window includes no monitoring occasion of a wake-up signal in at least one search space set configured for a terminal device, monitoring a physical downlink control channel within an on duration time period of a discontinuous reception DRX state, where the first time window is a time window for monitoring the wake-up signal, the wake-up signal indicates the terminal device to monitor the physical downlink control channel within the on duration time period, and the first time window is prior to the on duration time period.

20 Claims, 12 Drawing Sheets

(58) Field of Classification Search
CPC .............. H04W 52/028; H04W 68/00; H04W 76/28; Y02D 30/70
USPC ........................................................ 370/318
See application file for complete search history.

(56) References Cited

FOREIGN PATENT DOCUMENTS

| CN | 109952789 A | 6/2019 |
|---|---|---|
| CN | 109983822 A | 7/2019 |
| CN | 110012523 A | 7/2019 |
| CN | 110167128 A | 8/2019 |
| RU | 2686111 C2 | 4/2019 |
| WO | 2018174635 A1 | 9/2018 |
| WO | 2018175760 A1 | 9/2018 |
| WO | 2018204799 A1 | 11/2018 |
| WO | 2019037119 A1 | 2/2019 |
| WO | 2019125748 A1 | 6/2019 |

OTHER PUBLICATIONS

3GPP TS 38.213 V15.6.0 (Jun. 2019), "3rd Generation Partnership Project; Technical Specification Group Radio Access Network; NR; Physical layer procedures for control (Release 15)," Jun. 2019, 107 pages.
3GPP TS 38.321 V15.6.0 (Jun. 2019), "3rd Generation Partnership Project; Technical Specification Group Radio Access Network; NR; Medium Access Control (MAC) protocol specification (Release 15)," Jun. 2019, 78 pages.
3GPP TS 38.331 V15.6.0 (Jun. 2019), "3rd Generation Partnership Project; Technical Specification Group Radio Access Network; NR; Radio Resource Control (RRC) protocol specification (Release 15)," Jun. 2019, 519 pages.
Catt, "Summary of PDCCH-based Power Saving Signal/Channel," 3GPP TSG RAN WG1 #97, R1-1907711, Reno, China, May 13-17, 2019, 8 pages.
Huawei et al., "PDCCH-based power saving signal/channel," 3GPP TSG RAN WG1 Meeting #97, R1-1906005, Reno, USA, May 13-17, 2019, 10 pages.
Nokia et al., "On the RAN2 aspects on power signal/channel for wake-up," 3GPP TSG-RAN WG2 Meeting #106, R2-1906700, Reno, USA, May 13-17, 2019, 5 pages.
Nokia et al., "PDCCH-based power saving signal/channel," 3GPP TSG RAN WG1 meeting #97, R1-1907375, Reno, USA, May 13-17, 2019, 9 pages.
PCT International Search Report and Written Opinion issued in International Application No. PCT/CN2019/103855 dated May 27, 2020, 16 pages (with English translation).
PCT International Search Report and Written Opinion issued in International Application No. PCT/CN2020/076241 dated May 21, 2020, 17 pages (with English translation).
Qualcomm Incorporated, "PDCCH-based power saving channel design," 3GPP TSG-RAN WG1 #97, R1-1907294, Reno, USA, May 13-17, 2019, 16 pages.
Extended European Search Report issued in European Application No. 20858270.0 dated Aug. 18, 2022, 13 pages.
Office Action in Russian Appln. No. 2022108173, dated Apr. 21, 2023, 19 pages (with English translation).
Search Report in Russian Appln. No. 2022108173, dated Apr. 21, 2023, 4 pages (with English translation).

* cited by examiner

COMMUNICATION METHOD AND APPARATUS, AND COMPUTER-READABLE STORAGE MEDIUM

CROSS-REFERENCE TO RELATED APPLICATIONS

This application is a continuation of International Application No. PCT/CN2020/076241, filed on Feb. 21, 2020, which claims priority to International Application No. PCT/CN2019/103855, filed on Aug. 30, 2019. The disclosures of the aforementioned applications are hereby incorporated by reference in their entireties

TECHNICAL FIELD

This application relates to the field of communications technologies, and in particular, to a communication method and apparatus, and a computer-readable storage medium.

BACKGROUND

Currently, a terminal device may monitor a physical downlink control channel-based wake-up signal (physical downlink control channel-based wake-up signal, PDCCH WUS for short) in a wake-up signal (Wake-up signal, WUS) search time window. If the terminal device detects the PDCCH WUS in the WUS search time window, the terminal device monitors a downlink control channel in an on duration time period of a discontinuous reception (Discontinuous Reception, DRX) state. If the terminal device detects no PDCCH WUS in the WUS search time window, the terminal device remains in a sleep state in the on duration time period of the DRX state, that is, the terminal device does not monitor a PDCCH.

Similar to a transmission occasion of the PDCCH, a transmission occasion of the PDCCH WUS may be in a predefined search space set (search space set). The search space set has a preconfigured bandwidth and a preconfigured transmission periodicity on a time-frequency resource. In the prior art, to reduce overheads of a downlink air interface resource, a network device generally sets the transmission periodicity of the search space set to be greater than the WUS search time window. However, such a setting usually causes the following case: The transmission occasion of the PDCCH WUS falls outside the WUS search window. Because no transmission occasion of the PDCCH WUS exists in the WUS search window, the terminal device cannot determine when to monitor the PDCCH WUS, and definitely cannot detect the WUS within the WUS search time window even if monitoring is performed. Consequently, when on duration arrives, the terminal device does not know how to respond and data sending or receiving is delayed.

In addition, even if the transmission occasion of the PDCCH WUS exactly falls within the WUS search window, if the transmission occasion of the PDCCH WUS falls within a switch delay time corresponding to bandwidth part (bandwidth part, BWP) switch performed by the terminal device, because a radio frequency transceiver function of the terminal device is interrupted, the terminal device still cannot monitor whether the network device sends the PDCCH WUS in the WUS search time window. Consequently, when on duration arrives, the terminal device still does not know how to respond, and data sending or receiving is delayed.

SUMMARY

Embodiments of the present invention provide a communication method and apparatus, and a computer-readable storage medium, to resolve a prior-art problem that data sending or data receiving of a terminal device is delayed.

According to a first aspect, an embodiment of the present invention provides a first communication method. The method may be performed by a communications apparatus, and the communications apparatus is, for example, a terminal device or a chip in a terminal device. The method includes: if no monitoring occasion of a wake-up signal exists in a first time window, or a first time window includes no monitoring occasion of a wake-up signal in at least one search space set configured for the terminal device, monitoring a physical downlink control channel within an on duration time period of a discontinuous reception DRX state, where the first time window is a time window for monitoring the wake-up signal, the wake-up signal indicates the terminal device to monitor the physical downlink control channel within the on duration time period, and the first time window is prior to the on duration time period.

Correspondingly, according to a second aspect, a communication method is provided. The method may be performed by a communications apparatus. The communications apparatus is, for example, a network device or a chip in a network device, and the network device is, for example, a base station. The method includes: if no monitoring occasion of a wake-up signal exists in a first time window, or a first time window includes no monitoring occasion of a wake-up signal in at least one search space set configured for a terminal device, sending a physical downlink control channel within an on duration time period of a discontinuous reception DRX state, where the first time window is a time window for monitoring the wake-up signal, the wake-up signal indicates the terminal device to monitor the physical downlink control channel within the on duration time period, and the first time window is prior to the on duration time period.

In this embodiment of the present invention, when no monitoring occasion of the WUS exists in the first time window or when the first time window includes no monitoring occasion of the WUS in the at least one search space set configured for the terminal device, the terminal device clearly knows behavior to be performed when on duration arrives. To be specific, when on duration arrives, the terminal device wakes up and monitors the PDCCH. On one hand, this can avoid a problem that data sending or receiving is delayed because the terminal device does not clearly know the behavior to be performed when on duration arrives. On the other hand, the network device may configure a transmission periodicity of a search space set to be greater than a length of a WUS search time window. When the network device sends a PDCCH WUS on a group-based PDCCH, downlink signaling overheads can be reduced.

In a possible design, the wake-up signal is a user equipment-specific physical downlink control channel wake-up signal UE-specific PDCCH WUS or a group-based wake-up signal group-based WUS. This is not limited herein.

In this implementation, flexibility of sending the wake-up signal by the network device can be improved.

According to a third aspect, a communication method is provided. The method may be performed by a communications apparatus, and the communications apparatus is, for example, a terminal device or a chip in a terminal device. The method includes: if a monitoring occasion of a wake-up signal exists in a first time window, and the monitoring occasion of the wake-up signal falls within a switch delay time corresponding to BWP switch, monitoring a physical downlink control channel within an on duration time period of a discontinuous reception DRX state, where the first time window is a time window for monitoring the wake-up signal, the wake-up signal indicates the terminal device to monitor the physical downlink control channel within the on duration time period, and the first time window is prior to the on duration time period.

In a possible design, the wake-up signal is a user equipment-specific physical downlink control channel wake-up signal UE-specific PDCCH WUS or a group-based wake-up signal group-based WUS. This is not limited herein.

In this implementation, flexibility of sending the wake-up signal by the network device can be improved.

In a possible design, the BWP switch may include switching from a first BWP of a first cell to a second BWP of the first cell. Correspondingly, that a monitoring occasion of a wake-up signal exists in a first time window includes: a monitoring occasion of a wake-up signal configured in the second BWP exists in the first time window; and the monitoring a physical downlink control channel within an on duration time period includes: monitoring the physical downlink control channel within an on duration time period of a DRX state configured in the second BWP.

In this implementation, when the terminal device cannot monitor, due to the BWP switch in the first cell, the WUS in a BWP, of the first cell, to which the terminal device switches, the terminal device clearly knows behavior to be performed when on duration arrives. To be specific, when on duration in the BWP to which the terminal device switches arrives, the terminal device wakes up and monitors the PDCCH. This can avoid a problem that data sending or receiving in the first cell is delayed because the terminal device does not know the behavior to be performed when on duration arrives.

In another possible design, the BWP switch includes switching from a first BWP of a first cell to a second BWP of the first cell. Correspondingly, that a monitoring occasion of a wake-up signal exists in a first time window includes: a monitoring occasion of a wake-up signal configured in a BWP of a second cell exists in the first time window; and the monitoring a physical downlink control channel within an on duration time period includes: monitoring the physical downlink control channel within an on duration time period of a DRX state configured in the BWP of the second cell.

In this implementation, when the terminal device cannot monitor the WUS in the BWP of the second cell due to the BWP switch in the first cell, the terminal device clearly knows behavior to be performed when on duration arrives. To be specific, when on duration in the BWP of the second cell arrives, the terminal device wakes up and monitors the PDCCH. This can avoid a problem that data sending or receiving in the second cell is delayed because the terminal device does not clearly know the behavior to be performed when on duration arrives.

Correspondingly, according to a fourth aspect, a communication method is provided. The method may be performed by a communications apparatus. The communications apparatus is, for example, a network device or a chip in a network device, and the network device is, for example, a base station. The method includes: if a monitoring occasion of a wake-up signal exists in a first time window, and the monitoring occasion of the wake-up signal falls within a switch delay time corresponding to BWP switch, sending a physical downlink control channel within an on duration time period of a discontinuous reception DRX state, where the first time window is a time window for monitoring the wake-up signal, the wake-up signal indicates a terminal device to monitor the physical downlink control channel within the on duration time period, and the first time window is prior to the on duration time period.

In this embodiment of the present invention, when the terminal device cannot monitor the WUS due to the BWP switch, the terminal device clearly knows behavior to be performed when on duration arrives. To be specific, when on duration arrives, the terminal device wakes up and monitors the PDCCH, and the network device may send the PDCCH when on duration arrives. This can avoid a problem that data sending or receiving is delayed because the terminal device does not clearly know the behavior to be performed when on duration arrives.

In a possible design, the wake-up signal is a user equipment-specific physical downlink control channel wake-up signal UE-specific PDCCH WUS or a group-based wake-up signal group-based WUS. This is not limited herein.

In this implementation, flexibility of sending the wake-up signal by the network device can be improved.

In a possible design, the BWP switch may include switching from a first BWP of a first cell to a second BWP of the first cell. Correspondingly, that a monitoring occasion of a wake-up signal exists in a first time window includes: a monitoring occasion of a wake-up signal configured in the second BWP exists in the first time window; and the sending a physical downlink control channel within an on duration time period includes: sending the physical downlink control channel within an on duration time period of a DRX state configured in the second BWP.

In this implementation, when the terminal device cannot monitor, due to the BWP switch in the first cell, the WUS in a BWP, of the first cell, to which the terminal device switches, the terminal device clearly knows behavior to be performed when on duration arrives. To be specific, when on duration in the BWP to which the terminal device switches arrives, the terminal device wakes up and monitors the PDCCH, and the network device may send the PDCCH when on duration in the BWP to which the terminal device switches arrives. This can avoid a problem that data sending or receiving in the first cell is delayed because the terminal device does not clearly know the behavior to be performed when on duration arrives.

In another possible design, the BWP switch includes switching from a first BWP of a first cell to a second BWP of the first cell. Correspondingly, that a monitoring occasion of a wake-up signal exists in a first time window includes: a monitoring occasion of a wake-up signal configured in a BWP of a second cell exists in the first time window; and the sending a physical downlink control channel within an on duration time period includes: sending the physical downlink control channel within an on duration time period of a DRX state configured in the BWP of the second cell.

In this implementation, when the terminal device cannot monitor the WUS in the BWP of the second cell due to BWP switch in the first cell, the terminal device clearly knows behavior to be performed when on duration arrives. To be specific, when on duration in the BWP of the second cell arrives, the terminal device wakes up and monitors the PDCCH, and the network device may send the PDCCH when on duration in the BWP of the second cell arrives. This can avoid a problem that data sending or receiving in the second cell is delayed because the terminal device does not know the behavior to be performed when on duration arrives.

According to a fifth aspect, a communication method is provided. The method may be performed by a communications apparatus, and the communications apparatus is, for example, a terminal device or a chip in a terminal device. The method includes: if a monitoring occasion of a wake-up signal exists in a first time window, and the monitoring occasion of the wake-up signal partially or completely coincides with a time-domain resource to which a flexible symbol flexible symbol belongs, monitoring a physical downlink control channel within an on duration time period of a discontinuous reception DRX state, where the first time window is a time window for monitoring the wake-up signal, the wake-up signal indicates the terminal device to monitor the physical downlink control channel within the on duration time period, and the first time window is prior to the on duration time period.

Correspondingly, according to a sixth aspect, a communication method is provided. The method may be performed by a communications apparatus. The communications apparatus is, for example, a network device or a chip in a network device, and the network device is, for example, a base station. The method includes: if a monitoring occasion of a wake-up signal exists in a first time window, and the monitoring occasion of the wake-up signal partially or completely coincides with a time-domain resource to which a flexible symbol flexible symbol belongs, sending a physical downlink control channel within an on duration time period of a discontinuous reception DRX state, where the first time window is a time window for monitoring the wake-up signal, the wake-up signal indicates a terminal device to monitor the physical downlink control channel within the on duration time period, and the first time window is prior to the on duration time period.

In this implementation, when the monitoring occasion of the wake-up signal coincides with a time-frequency resource in which the flexible symbol is located, the terminal device clearly knows that the flexible symbol cannot be occupied by the WUS, and is fixed as a downlink symbol. In addition, the terminal device clearly knows behavior of the terminal device to be performed in the on duration time period after the monitoring occasion of the wake-up signal coincides with the time-frequency resource in which the flexible symbol is located. To be specific, when on duration following the flexible symbol arrives, the terminal device wakes up and monitors the PDCCH. In this way, the flexible symbol may be flexibly used for uplink or downlink transmission, to avoid a problem that data sending or receiving is delayed because the terminal device does not know the behavior to be performed when on duration arrives.

In this embodiment of the present invention, when the monitoring occasion of the wake-up signal exists in the first time window, and the monitoring occasion of the wake-up signal partially or completely coincides with the time-domain resource to which the flexible symbol flexible symbol belongs, the terminal device clearly knows behavior to be performed when on duration arrives. To be specific, when on duration arrives, the terminal device wakes up and monitors the PDCCH. In this way, the flexible symbol may be flexibly used for uplink or downlink transmission, to avoid a problem that data sending or receiving is delayed because the terminal device does not know the behavior to be performed when on duration arrives.

In a possible design, the wake-up signal is a user equipment-specific physical downlink control channel wake-up signal UE-specific PDCCH WUS or a group-based wake-up signal group-based WUS.

In this implementation, flexibility of sending the wake-up signal by the network device can be improved.

In a possible design, the flexible symbol includes at least one of a frame, a subframe, a slot, or a symbol configured through common configuration signaling or dedicated configuration signaling.

In this implementation, flexibility of configuring the flexible symbol by the network device can be improved.

According to a seventh aspect, an embodiment of the present invention provides a communication method. The method may be performed by a communications apparatus, and the communications apparatus is, for example, a terminal device or a chip in a terminal device. The method includes: if the terminal device cannot monitor a wake-up signal in a first time window, monitoring a physical downlink control channel within an on duration time period of a discontinuous reception DRX state, where the first time window is a time window for monitoring the wake-up signal, the wake-up signal indicates the terminal device to monitor the physical downlink control channel within the on duration time period, and the first time window is prior to the on duration time period.

In this embodiment of the present invention, when the terminal device cannot monitor the WUS in the first time window, the terminal device clearly knows behavior to be performed when on duration arrives. To be specific, when on duration arrives, the terminal device wakes up and monitors the PDCCH. This can avoid a problem that data sending or receiving is delayed because the terminal device does not clearly know the behavior to be performed when on duration arrives.

In this embodiment of the present invention, there are at least the following three reasons why the terminal device cannot monitor the WUS in the first time window. Reason 1: No monitoring occasion of the wake-up signal exists in the first time window. Reason 2: The first time window includes no monitoring occasion of the wake-up signal in at least one search space set configured for the terminal device. Reason 3: The monitoring occasion of the wake-up signal exists in the first time window, and the monitoring occasion of the wake-up signal falls within a switch delay time corresponding to BWP switch. Reason 4: The monitoring occasion of the wake-up signal exists in the first time window, and the monitoring occasion of the wake-up signal partially or completely coincides with a time-domain resource to which a flexible symbol flexible symbol belongs.

In this implementation, when the terminal device cannot monitor the PDCCH WUS because no monitoring occasion of the WUS exists in a configured WUS search time window (that is, the first time window), or the first time window includes no monitoring occasion of the wake-up signal in the at least one search space set configured for the terminal device, or BWP switch occurs, or the monitoring occasion of the wake-up signal partially or completely coincides with the time-domain resource to which the flexible symbol belongs, the terminal device clearly knows behavior to be performed when DRX_ON arrives. To be specific, when DRX_ON arrives, the terminal device wakes up and monitors the PDCCH. On one hand, this can avoid a problem that data sending or receiving is delayed because the terminal device does not clearly know the behavior to be performed when on duration arrives. On the other hand, a network device may configure a transmission periodicity of a search space set to be greater than a length of the WUS search time window. When the network device sends the PDCCH WUS on a group-based PDCCH, downlink signaling overheads can be reduced. In addition, the flexible symbol may be flexibly used for uplink or downlink transmission.

In a possible design, the wake-up signal is a user equipment-specific physical downlink control channel wake-up signal UE-specific PDCCH WUS or a group-based wake-up signal group-based WUS. This is not limited herein.

In this implementation, flexibility of sending the wake-up signal by the network device can be improved.

In a possible design, the BWP switch may include switching from a first BWP of a first cell to a second BWP of the first cell. Correspondingly, that a monitoring occasion of a wake-up signal exists in a first time window includes: a monitoring occasion of a wake-up signal configured in the second BWP exists in the first time window; and the monitoring a physical downlink control channel within an on duration time period includes: monitoring the physical downlink control channel within an on duration time period of a DRX state configured in the second BWP.

In this implementation, when the terminal device cannot monitor, due to the BWP switch in the first cell, the WUS in a BWP, of the first cell, to which the terminal device switches, the terminal device clearly knows behavior to be performed when on duration arrives. To be specific, when on duration in the BWP to which the terminal device switches arrives, the terminal device wakes up and monitors the PDCCH. This can avoid a problem that data sending or receiving in the first cell is delayed because the terminal device does not know the behavior to be performed when on duration arrives.

In another possible design, the BWP switch includes switching from a first BWP of a first cell to a second BWP of the first cell. Correspondingly, that a monitoring occasion of a wake-up signal exists in a first time window includes: a monitoring occasion of a wake-up signal configured in a BWP of a second cell exists in the first time window; and the monitoring a physical downlink control channel within an on duration time period includes: monitoring the physical downlink control channel within an on duration time period of a DRX state configured in the BWP of the second cell.

In this implementation, when the terminal device cannot monitor the WUS in the BWP of the second cell due to BWP switch in the first cell, the terminal device clearly knows behavior to be performed when on duration arrives. To be specific, when on duration in the BWP of the second cell arrives, the terminal device wakes up and monitors the PDCCH. This can avoid a problem that data sending or receiving in the second cell is delayed because the terminal device does not know the behavior to be performed when on duration arrives.

Correspondingly, according to an eighth aspect, a communication method is provided. The method may be performed by a communications apparatus. The communications apparatus is, for example, a network device or a chip in a network device, and the network device is, for example, a base station. The method includes: if a terminal device cannot monitor a wake-up signal in a first time window, sending a physical downlink control channel within an on duration time period of a discontinuous reception DRX state, where the first time window is a time window for monitoring the wake-up signal, the wake-up signal indicates a terminal device to monitor the physical downlink control channel within the on duration time period, and the first time window is prior to the on duration time period.

In this embodiment of the present invention, when the terminal device cannot monitor the WUS in the first time window, the terminal device clearly knows behavior to be performed when on duration arrives. To be specific, when on duration arrives, the terminal device wakes up and monitors the PDCCH, and the network device may send the PDCCH when on duration arrives. This can avoid a problem that data sending or receiving is delayed because the terminal device does not clearly know the behavior to be performed when on duration arrives.

In this embodiment of the present invention, there are at least the following three reasons why the terminal device cannot monitor the WUS in the first time window. Reason 1: No monitoring occasion of the wake-up signal exists in the first time window. Reason 2: The first time window includes no monitoring occasion of the wake-up signal in at least one search space set configured for the terminal device. Reason 3: The monitoring occasion of the wake-up signal exists in the first time window, and the monitoring occasion of the wake-up signal falls within a switch delay time corresponding to BWP switch. Reason 4: The monitoring occasion of the wake-up signal exists in the first time window, and the monitoring occasion of the wake-up signal partially or completely coincides with a time-domain resource to which a flexible symbol flexible symbol belongs.

In this implementation, when the terminal device cannot monitor the PDCCH WUS because no monitoring occasion of the WUS exists in a configured WUS search time window (that is, the first time window), or the first time window includes no monitoring occasion of the wake-up signal in the at least one search space set configured for the terminal device, or BWP switch occurs, or the monitoring occasion of the wake-up signal partially or completely coincides with the time-domain resource to which the flexible symbol belongs, the terminal device clearly knows behavior to be performed when DRX_ON arrives. To be specific, when DRX_ON arrives, the terminal device wakes up and monitors the PDCCH, and the network device may send the PDCCH when DRX_ON arrives. On one hand, this can avoid a problem that data sending or receiving is delayed because the terminal device does not clearly know the behavior to be performed when on duration arrives. On the other hand, a network device may configure a transmission periodicity of a search space set to be greater than a length of the WUS search time window. When the network device sends the PDCCH WUS on a group-based PDCCH, downlink signaling overheads can be reduced. In addition, the flexible symbol may be flexibly used for uplink or downlink transmission.

In a possible design, the wake-up signal is a user equipment-specific physical downlink control channel wake-up signal UE-specific PDCCH WUS or a group-based wake-up signal group-based WUS. This is not limited herein.

In this implementation, flexibility of sending the wake-up signal by the network device can be improved.

In a possible design, the BWP switch may include switching from a first BWP of a first cell to a second BWP of the first cell. Correspondingly, that a monitoring occasion of a wake-up signal exists in a first time window includes: a monitoring occasion of a wake-up signal configured in the second BWP exists in the first time window; and the sending a physical downlink control channel within an on duration time period includes: sending the physical downlink control channel within an on duration time period of a DRX state configured in the second BWP.

In this implementation, when the terminal device cannot monitor, due to the BWP switch in the first cell, the WUS in a BWP, of the first cell, to which the terminal device switches, the terminal device clearly knows behavior to be performed when on duration arrives. To be specific, the terminal device wakes up and monitors the PDCCH when on duration in the BWP to which the terminal device switches arrives, and the network device may send the PDCCH when on duration in the BWP to which the terminal device switches arrives. This can avoid a problem that data sending or receiving in the first cell is delayed because the terminal device does not know the behavior to be performed when on duration arrives.

In another possible design, the BWP switch includes switching from a first BWP of a first cell to a second BWP of the first cell. Correspondingly, that a monitoring occasion of a wake-up signal exists in a first time window includes: a monitoring occasion of a wake-up signal configured in a BWP of a second cell exists in the first time window; and the sending a physical downlink control channel within an on duration time period includes: sending the physical downlink control channel within an on duration time period of a DRX state configured in the BWP of the second cell.

In this implementation, when the terminal device cannot monitor the WUS in the BWP of the second cell due to BWP switch in the first cell, the terminal device clearly knows behavior to be performed when on duration arrives. To be specific, when on duration in the BWP of the second cell arrives, the terminal device wakes up and monitors the PDCCH, and the network device may send the PDCCH when on duration in the BWP of the second cell arrives. This can avoid a problem that data sending or receiving in the second cell is delayed because the terminal device does not know the behavior to be performed when on duration arrives.

According to a ninth aspect, a communications apparatus is provided. The communications apparatus is, for example, a terminal device. The communications apparatus has functions of implementing the terminal device in the method designs. The functions may be implemented by hardware, or may be implemented by hardware executing corresponding software. The hardware or the software includes one or more units corresponding to the foregoing functions.

In a possible design, the apparatus includes: a determining unit, configured to determine whether a monitoring occasion of a wake-up signal exists in a first time window, or whether a first time window includes a monitoring occasion of a wake-up signal in at least one search space set configured for the terminal device; and a monitoring unit, configured to: when no monitoring occasion of the wake-up signal exists in the first time window, or the first time window includes no monitoring occasion of the wake-up signal in the at least one search space set configured for the terminal device, monitor a physical downlink control channel within an on duration time period of a discontinuous reception DRX state, where the first time window is a time window for monitoring the wake-up signal, the wake-up signal indicates the terminal device to monitor the physical downlink control channel within the on duration time period, and the first time window is prior to the on duration time period.

In a possible design, the wake-up signal is a user equipment-specific physical downlink control channel wake-up signal UE-specific PDCCH WUS or a group-based wake-up signal group-based WUS.

Correspondingly, according to a tenth aspect, a communications apparatus is provided. The communications apparatus is, for example, a network device. The communications apparatus has functions of implementing the network device in the method designs. The functions may be implemented by hardware, or may be implemented by hardware executing corresponding software. The hardware or the software includes one or more units corresponding to the foregoing functions.

In a possible design, the apparatus includes: a determining unit, configured to determine whether a monitoring occasion of a wake-up signal exists in a first time window, or whether a first time window includes a monitoring occasion of a wake-up signal in at least one search space set configured for a terminal device; and a sending unit, configured to: when no monitoring occasion of the wake-up signal exists in the first time window, or the first time window includes no monitoring occasion of the wake-up signal in the at least one search space set configured for the terminal device, send a physical downlink control channel within an on duration time period of a discontinuous reception DRX state, where the first time window is a time window for monitoring the wake-up signal, the wake-up signal indicates the terminal device to monitor the physical downlink control channel within the on duration time period, and the first time window is prior to the on duration time period.

In a possible design, the wake-up signal is a user equipment-specific physical downlink control channel wake-up signal UE-specific PDCCH WUS or a group-based wake-up signal group-based WUS.

According to an eleventh aspect, a communications apparatus is provided. The communications apparatus is, for example, a terminal device. The communications apparatus has functions of implementing the terminal device in the method designs. The functions may be implemented by hardware, or may be implemented by hardware executing corresponding software. The hardware or the software includes one or more units corresponding to the foregoing functions.

In a possible design, the apparatus includes: a determining unit, configured to determine whether a monitoring occasion of a wake-up signal exists in a first time window, and whether the monitoring occasion of the wake-up signal falls within a switch delay time corresponding to BWP switch; and a monitoring unit, configured to: when the monitoring occasion of the wake-up signal exists in the first time window, and the monitoring occasion of the wake-up signal falls within the switch delay time corresponding to BWP switch, monitor a physical downlink control channel within an on duration time period of a discontinuous reception DRX state, where the first time window is a time window for monitoring the wake-up signal, the wake-up signal indicates the terminal device to monitor the physical downlink control channel within the on duration time period, and the first time window is prior to the on duration time period.

Correspondingly, according to a twelfth aspect, a communications apparatus is provided. The communications apparatus is, for example, a network device. The communications apparatus has functions of implementing the network device in the method designs. The functions may be implemented by hardware, or may be implemented by hardware executing corresponding software. The hardware or the software includes one or more units corresponding to the foregoing functions.

In a possible design, the apparatus includes: a determining unit, configured to determine whether a monitoring occasion of a wake-up signal exists in a first time window, and whether the monitoring occasion of the wake-up signal falls within a switch delay time corresponding to BWP switch; and a sending unit, configured to: when the monitoring occasion of the wake-up signal exists in the first time window, and the monitoring occasion of the wake-up signal falls within the switch delay time corresponding to BWP switch, send a physical downlink control channel within an on duration time period of a discontinuous reception DRX state, where the first time window is a time window for monitoring the wake-up signal, the wake-up signal indicates a terminal device to monitor the physical downlink control channel within the on duration time period, and the first time window is prior to the on duration time period.

In a possible design, the BWP switch includes switching from a first BWP of a first cell to a second BWP of the first cell; that a monitoring occasion of a wake-up signal exists in a first time window includes: a monitoring occasion of a wake-up signal configured in the second BWP exists in the first time window; and the sending unit is specifically configured to: send the physical downlink control channel within an on duration time period of a DRX state configured in the second BWP.

In a possible design, the BWP switch includes switching from a first BWP of a first cell to a second BWP of the first cell; that a monitoring occasion of a wake-up signal exists in a first time window includes: a monitoring occasion of a wake-up signal configured in a BWP of a second cell exists in the first time window; and the sending unit is specifically configured to: send the physical downlink control channel within an on duration time period of a DRX state configured in the BWP of the second cell.

In a possible design, the wake-up signal is a user equipment-specific physical downlink control channel wake-up signal UE-specific PDCCH WUS or a group-based wake-up signal group-based WUS.

According to a thirteenth aspect, a communications apparatus is provided. The communications apparatus is, for example, a terminal device. The communications apparatus has functions of implementing the terminal device in the method designs. The functions may be implemented by hardware, or may be implemented by hardware executing corresponding software. The hardware or the software includes one or more units corresponding to the foregoing functions.

In a possible design, the apparatus includes: a determining unit, configured to determine whether a monitoring occasion of a wake-up signal exists in a first time window, and whether the monitoring occasion of the wake-up signal partially or completely coincides with a time-domain resource to which a flexible symbol flexible symbol belongs; and a monitoring unit, configured to: when the monitoring occasion of the wake-up signal exists in the first time window, and the monitoring occasion of the wake-up signal partially or completely coincides with the time-domain resource to which the flexible symbol belongs, monitor a physical downlink control channel within an on duration time period of a discontinuous reception DRX state, where the first time window is a time window for monitoring the wake-up signal, the wake-up signal indicates the terminal device to monitor the physical downlink control channel within the on duration time period, and the first time window is prior to the on duration time period.

Correspondingly, according to a fourteenth aspect, a communications apparatus is provided. The communications apparatus is, for example, a network device. The communications apparatus has functions of implementing the network device in the method designs. The functions may be implemented by hardware, or may be implemented by hardware executing corresponding software. The hardware or the software includes one or more units corresponding to the foregoing functions.

In a possible design, the apparatus includes: a determining unit, configured to determine whether a monitoring occasion of a wake-up signal exists in a first time window, and whether the monitoring occasion of the wake-up signal partially or completely coincides with a time-domain resource to which a flexible symbol flexible symbol belongs; and a sending unit, configured to: when the monitoring occasion of the wake-up signal exists in the first time window, and the monitoring occasion of the wake-up signal partially or completely coincides with the time-domain resource to which the flexible symbol belongs, send a physical downlink control channel within an on duration time period of a discontinuous reception DRX state, where the first time window is a time window for monitoring the wake-up signal, the wake-up signal indicates a terminal device to monitor the physical downlink control channel within the on duration time period, and the first time window is prior to the on duration time period.

In a possible design, the wake-up signal is a user equipment-specific physical downlink control channel wake-up signal UE-specific PDCCH WUS or a group-based wake-up signal group-based WUS.

In a possible design, the flexible symbol includes at least one of a frame, a subframe, a slot, or a symbol configured through common configuration signaling or dedicated configuration signaling.

According to a fifteenth aspect, a communications apparatus is provided. The communications apparatus is, for example, a terminal device. The communications apparatus has functions of implementing the terminal device in the method designs. The functions may be implemented by hardware, or may be implemented by hardware executing corresponding software. The hardware or the software includes one or more units corresponding to the foregoing functions.

In a possible design, the apparatus includes: a determining unit, configured to determine whether the terminal device can monitor a wake-up signal in a first time window; and a monitoring unit, configured to: when the terminal device cannot monitor the wake-up signal in the first time window, monitor a physical downlink control channel in an on duration time period of a discontinuous reception DRX state, where the first time window is a time window for monitoring the wake-up signal, the wake-up signal indicates the terminal device to monitor the physical downlink control channel within the on duration time period, and the first time window is prior to the on duration time period.

Correspondingly, according to a sixteenth aspect, a communications apparatus is provided. The communications apparatus is, for example, a network device. The network device has functions of implementing the network device in the foregoing method designs. The functions may be implemented by hardware, or may be implemented by hardware executing corresponding software. The hardware or the software includes one or more units corresponding to the foregoing functions.

In a possible design, the apparatus includes: a determining unit, configured to determine whether a terminal device can monitor a wake-up signal in a first time window; and a sending unit, configured to: when the terminal device cannot monitor the wake-up signal in the first time window, send a physical downlink control channel in an on duration time period of a discontinuous reception DRX state, where the first time window is a time window for monitoring the wake-up signal, the wake-up signal indicates the terminal device to monitor the physical downlink control channel within the on duration time period, and the first time window is prior to the on duration time period.

In a possible design, there are at least the following three reasons why the terminal device cannot monitor the WUS in the first time window. Reason 1: No monitoring occasion of the wake-up signal exists in the first time window. Reason 2: The first time window includes no monitoring occasion of the wake-up signal in at least one search space set configured for the terminal device. Reason 3: The monitoring occasion of the wake-up signal exists in the first time window, and the monitoring occasion of the wake-up signal falls within a switch delay time corresponding to BWP switch. Reason 4: The monitoring occasion of the wake-up signal exists in the first time window, and the monitoring occasion of the wake-up signal partially or completely coincides with a time-domain resource to which a flexible symbol flexible symbol belongs.

In a possible design, the wake-up signal is a user equipment-specific physical downlink control channel wake-up signal UE-specific PDCCH WUS or a group-based wake-up signal group-based WUS. This is not limited herein.

In a possible design, the BWP switch may include switching from a first BWP of a first cell to a second BWP of the first cell. Correspondingly, that a monitoring occasion of a wake-up signal exists in a first time window includes; a monitoring occasion of a wake-up signal configured in the second BWP exists in the first time window; and the sending unit is configured to: send the physical downlink control channel within an on duration time period of a DRX state configured in the second BWP.

In another possible design, the BWP switch includes switching from a first BWP of a first cell to a second BWP of the first cell. Correspondingly, that a monitoring occasion of a wake-up signal exists in a first time window includes: a monitoring occasion of a wake-up signal configured in a BWP of a second cell exists in the first time window; and the sending unit is configured to; send the physical downlink control channel within an on duration time period of a DRX state configured in the BWP of the second cell.

According to a seventeenth aspect, an embodiment of the present invention provides a communications apparatus, and the communications apparatus is, for example, a terminal device. The communications apparatus has functions of implementing the terminal device in the method designs. The functions may be implemented by hardware, or may be implemented by hardware executing corresponding software. The hardware or the software includes one or more units corresponding to the foregoing functions.

In a possible design, a specific structure of the communications apparatus may include a memory, configured to store a computer program; and a processor, configured to execute the computer program stored in the memory, so that the apparatus performs a corresponding function in the method provided in any possible design of the first aspect, the third aspect, the fifth aspect, or the seventh aspect.

According to an eighteenth aspect, an embodiment of the present invention provides a communications apparatus, and the communications apparatus is, for example, a network device. The communications apparatus has functions of implementing the network device in the method designs. The functions may be implemented by hardware, or may be implemented by hardware executing corresponding software. The hardware or the software includes one or more units corresponding to the foregoing functions.

In a possible design, a specific structure of the communications apparatus may include a memory, configured to store a computer program; and a processor, configured to execute the computer program stored in the memory, so that the apparatus performs a corresponding function in the method provided in any possible design of the second aspect, the fourth aspect, the sixth aspect, or the eighth aspect.

According to a nineteenth aspect, a communications device is provided. The communications device is, for example, a terminal device. The communications device has functions of implementing the terminal device in the method designs. The functions may be implemented by hardware, or may be implemented by hardware executing corresponding software. The hardware or the software includes one or more units corresponding to the foregoing functions.

In a possible design, a specific structure of the communications device may include a processor, and optionally, may further include a transceiver. The processor and the transceiver may perform corresponding functions in the method provided in any possible design of the first aspect, the third aspect, the fifth aspect, or the seventh aspect.

According to a twentieth aspect, a communications device is provided. The communications device is, for example, a network device. The communications device has functions of implementing the network device in the method designs. The functions may be implemented by hardware, or may be implemented by hardware executing corresponding software. The hardware or the software includes one or more units corresponding to the foregoing functions.

In a possible design, a specific structure of the communications device may include a processor, and optionally, may further include a transceiver. The processor and the transceiver may perform corresponding functions in the method provided in any possible design of the second aspect, the fourth aspect, the sixth aspect, or the eighth aspect.

According to a twenty-first aspect, a computer-readable storage medium is provided, and includes a program or an instruction. When the program or the instruction is run on a computer, the method provided in any possible design of the first aspect, the third aspect, the fifth aspect, or the seventh aspect is performed.

According to a twenty-second aspect, a computer-readable storage medium is provided, and includes a program or an instruction. When the program or the instruction is run on a computer, the method provided in any possible design of the second aspect, the fourth aspect, the sixth aspect, or the eighth aspect is performed.

According to a twenty-third aspect, a chip is provided. The chip is coupled to a memory, and is configured to read and execute a program instruction stored in the memory, to implement the method provided in any possible design of the first aspect, the third aspect, the fifth aspect, or the seventh aspect.

According to a twenty-fourth aspect, a chip is provided. The chip is coupled to a memory, and is configured to read and execute a program instruction stored in the memory, to implement the method provided in any possible design of the second aspect, the fourth aspect, the sixth aspect, or the eighth aspect.

According to a twenty-fifth aspect, a computer program product including an instruction is provided. The computer program product stores the instruction, and when the instruction is run on a computer, the computer is enabled to perform the method provided in any possible design of the first aspect, the third aspect, the fifth aspect, or the seventh aspect.

According to a twenty-sixth aspect, a computer program product including an instruction is provided. The computer program product stores the instruction, and when the instruction is run on a computer, the computer is enabled to perform the method provided in any possible design of the second aspect, the fourth aspect, the sixth aspect, or the eighth aspect.

DESCRIPTION OF EMBODIMENTS

To make the objectives, technical solutions, and advantages of the embodiments of the present invention clearer, the following further describes the embodiments of the present invention in detail with reference to the accompanying drawings.

For ease of understanding the embodiments of the present invention, the following describes application scenarios of this application.

Currently, the 3rd generation partnership project (3rd Generation Partnership Project, 3GPP) standard organization is formulating a 5th generation (5th Generation, 5G) cellular mobile communications system protocol standard. 5G is also referred to as new radio (New Radio, NR). In comparison with a long term evolution (Long Term Evolution, LTE) system, NR supports a larger transmission bandwidth, more transceiver antenna arrays, a higher transmission rate, and a more flexible scheduling mechanism at a smaller granularity. Although more application scopes are provided based on the foregoing features of NR, power consumption of a terminal device is greatly increased. To reduce power consumption of the terminal device, a research subject of power saving (Power saving) is introduced to 3GPP NR Release 16, to research possible power reduction solutions for the terminal device in various states (including a connected (connection) mode, an idle mode, and an inactive mode). How to reduce power consumption of the terminal device in the connected mode is a research focus.

In the LTE system, a discontinuous reception (Discontinuous Reception, DRX) mechanism is designed in 3GPP to reduce power consumption of the terminal device in the connected mode. In the DRX mechanism, the terminal device starts an inactive timer (inactive timer) when the terminal device is in an active state in the connected mode, and the terminal device continuously attempts to receive a physical downlink control channel (physical downlink control channel, PDCCH). If the terminal device receives downlink control information (downlink control information, DCI) scheduled on the PDCCH, the terminal device restarts the inactive timer. If the terminal device receives no DCI within a period of time, the inactive timer expires, and the terminal device enters an inactive state of DRX.

Figure 1:
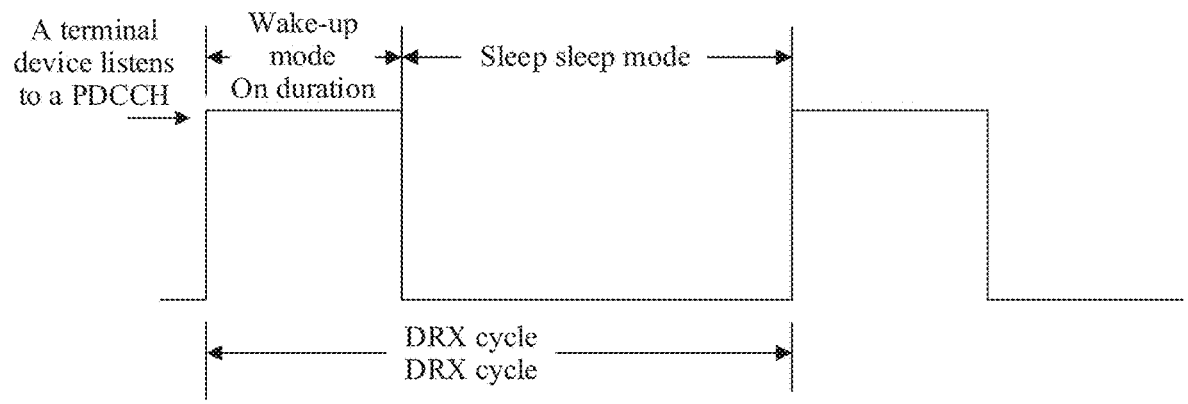
FIG. 1 is a schematic diagram of a DRX cycle.

As shown in FIG. 1, a DRX state is basically measured in a DRX cycle (DRX cycle), a time length of the DRX cycle is the DRX cycle, and one DRX cycle includes a sleep (Sleep) state (that is, the inactive state) and an on duration (on duration) state. On duration, that is, a wake-up mode, is also referred to as DRX_ON. When the DRX cycle enters on duration, the terminal device wakes up and listens to a PDCCH. Once the terminal device receives scheduling DCI on the PDCCH, the terminal device restarts the inactive timer for timing. After the inactive timer expires, the terminal device returns to the sleep mode. The sleep state, that is, the sleep mode, is also referred to as DRX_OFF. The terminal device in the sleep mode may completely disable communications components such as a radio frequency transceiver and a baseband processor, to reduce power consumption.

It should be noted that, the terminal device generally wakes up not when on duration arrives, but the terminal device first wakes up in several slots prior to on duration, and receives a downlink reference signal to perform time-frequency synchronization, to prevent deviations between a clock of a system and a clock of a network device and between an operating frequency of the system and an operating frequency of the network device caused due to long-time sleep of the terminal device. In addition, the terminal device may also first attempt to receive a downlink synchronization signal and update a system message, to prevent a deviation of a system message after the terminal device moves from one cell to another cell.

In the LTE system, a wake-up signal (Wake-up signal, WUS) is further designed in 3GPP. The WUS is a control signal introduced to narrowband internet of things (narrow band internet of things, NB-IoT) to reduce power consumption of the terminal device. The WUS is mainly applied to a paging mechanism when the terminal device is in an idle state. In the idle state, the terminal device is generally in the sleep state, but the terminal device needs to wake up at intervals to attempt to receive paging (Paging). A time point at which the terminal device is woken up to receive paging is referred to as a paging occasion (paging occasion, PO). In an actual system, the network device does not send paging to the terminal device in each PO. Therefore, waking up on POs to receive paging are mostly invalid operations for the terminal device, and this increases the power consumption of the terminal device. Therefore, the WUS is introduced to an NB-IoT system. If the network device indeed sends paging to the terminal device on a PO, the network device sends the WUS before the PO arrives. Otherwise, the network device does not send the WUS. Accordingly, the terminal device attempts to receive the WUS before the PO arrives. If the terminal device receives the WUS, the terminal device confirms that a paging message exists on a subsequent PO, and the terminal device continues to attempt to receive paging. Otherwise, if the terminal device receives no WUS, the terminal device considers that no paging message exists on the subsequent PO, and the terminal device does not attempt to receive paging and continues to sleep. In comparison with attempting to receive paging, it is power saving and less complex to receive the WUS for the terminal device. In addition, it is not very probably that the network device sends paging to the terminal device in the idle state. Therefore, determining, based on whether the terminal device receives the WUS, whether the terminal device is woken up can greatly reduce power consumption of the terminal device.

It is considered to introduce a PDCCH-based wake-up signal (PDCCH-based wake-up signal, PDCCH WUS or WUS for short) to NR Release 16. In other words, the WUS is carried on a PDCCH. The terminal device may enable a low power consumption mode in several slots prior to DRX_ON, and attempt to receive a PDCCH WUS sent by the network device. If the terminal device detects the PDCCH WUS in the period of time, the terminal device wakes up in a corresponding DRX_ON time period, and then monitors a PDCCH. Otherwise, if the terminal device receives no PDCCH WUS, the terminal device considers that no PDCCH scheduling is performed in the subsequent DRX_ON, and the terminal device does not attempt to receive the PDCCH and continues to sleep.

In addition to carrying a wake-up indication, the PDCCH WUS may further carry some other parameter configurations of the terminal device used in a power saving state, for example, a BWP in which the terminal device operates. The terminal device may camp in a BWP with a comparatively narrow bandwidth to monitor the WUS, and the WUS may indicate a BWP in which the terminal device operates after waking up. The operating BWP has a higher bandwidth and a higher data transmission rate. A method for indicating BWP switch by the PDCCH WUS may be as follows: The PDCCH WUS carries a target BWP ID, and the terminal device parses out the target BWP ID from the PDCCH WUS, and switches to a new BWP.

Figure 2:
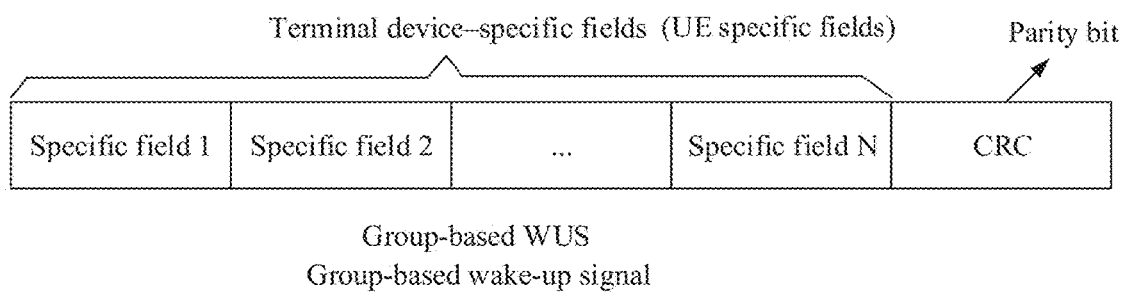
FIG. 2 is a schematic diagram of a signal format of a group-based WUS.

The PDCCH WUS may be a signal sent to single user equipment (user equipment, UE), that is, PDCCH DCI carries a WUS signal of only one UE. Such a PDCCH WUS is referred to as a user equipment-specific PDCCH wake-up signal (UE-specific PDCCH WUS). Although the UE-specific PDCCH WUS can carry a large quantity of parameter configurations, the UE-specific PDCCH WUS occupies an entire PDCCH, resulting in excessively high resource overheads. The PDCCH WUS may be alternatively a signal sent to a plurality of UEs, that is, one PDCCH DCI includes WUS signals and related configuration information that are of a plurality of UEs. As shown in FIG. 2, such a PDCCH WUS is referred to as a group-based wake-up signal (Group-based WUS). The group-based WUS can reduce overheads of downlink control signaling, but configuration information that can be sent to each user equipment is accordingly reduced.

Similar to a transmission occasion of the PDCCH, a transmission occasion of the PDCCH WUS may be in a predefined search space set (search space set). The search space set has a preconfigured bandwidth and a preconfigured transmission periodicity on a time-frequency resource.

Figure 3:
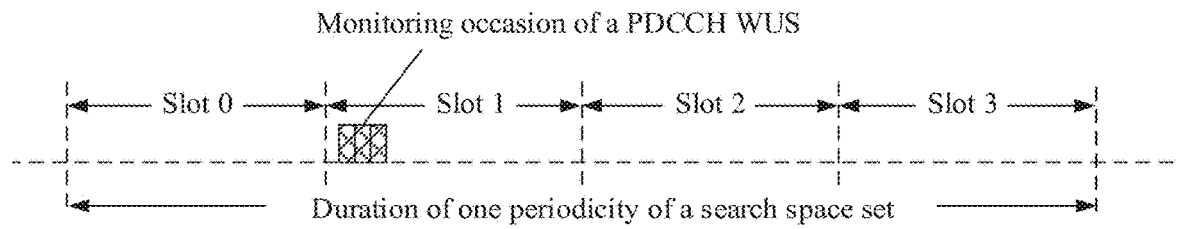
FIG. 3 is a schematic diagram of a transmission periodicity of one search space set.

The transmission periodicity of the search space set may be configured as a transmission periodicity ranging from 1 slot to 2560 slots. In one transmission periodicity, one or more consecutive slots may be used to send the PDCCH WUS. In each slot for sending the PDCCH WUS, the network device may further configure a specific symbol location for sending the PDCCH WUS. One to three symbols in one slot may be used to send one PDCCH WUS, and these symbols may be referred to as a monitoring occasion (monitoring occasion) of one PDCCH WUS. The UE can determine the monitoring occasion of the PDCCH WUS based on the configured periodicity of the search space set, a slot location of the PDCCH WUS in each periodicity, a location in which the PDCCH WUS occurs in a symbol of each slot, and a quantity of consecutive symbols. For example, FIG. 3 shows an example of one transmission periodicity of a search space set. In the transmission periodicity shown in FIG. 3, a monitoring occasion of a PDCCH WUS exists in a slot 1 (slot 1).

Figure 4:
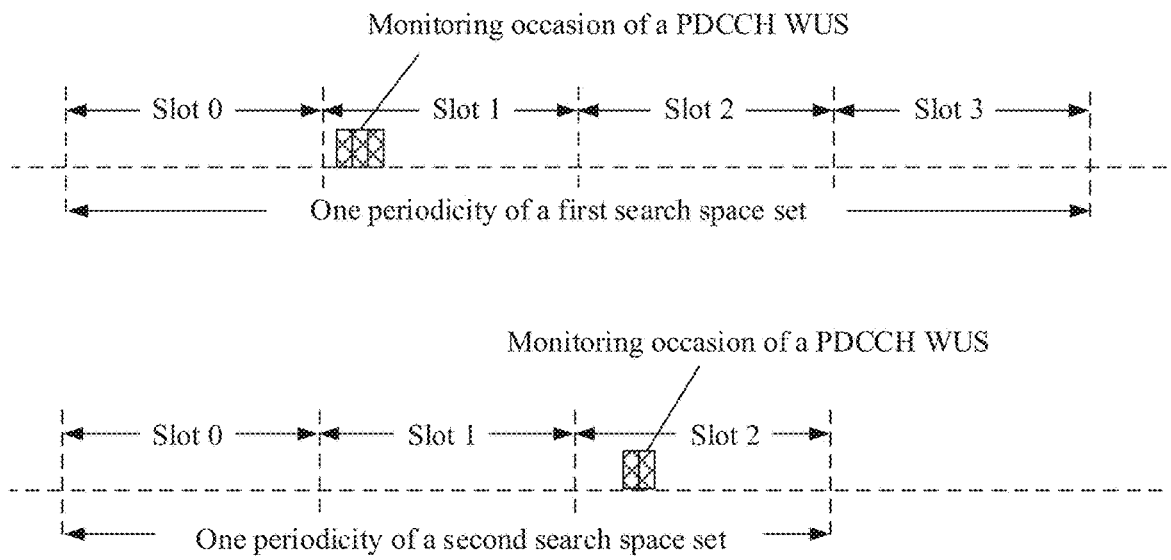
FIG. 4 is a schematic diagram of transmission periodicities of two search space sets.

It should be noted that, in a case of a high frequency band (a carrier frequency of a radio signal is greater than or equal to 6 GHz), the network device may send the PDCCH WUS through a plurality of search space sets, and different search space sets may have different PDCCH monitoring occasion configurations. For example, FIG. 4 shows an example in which the network device sends a PDCCH WUS through two search space sets (a first search space set and a second search space set). One transmission periodicity of the first search space set includes four slots, and a monitoring occasion of a PDCCH WUS falls within a slot 1 (slot 1). One transmission periodicity of the second search space set includes three slots, and a monitoring occasion of a PDCCH WUS falls within a slot 2 (slot 2).

Figure 5:
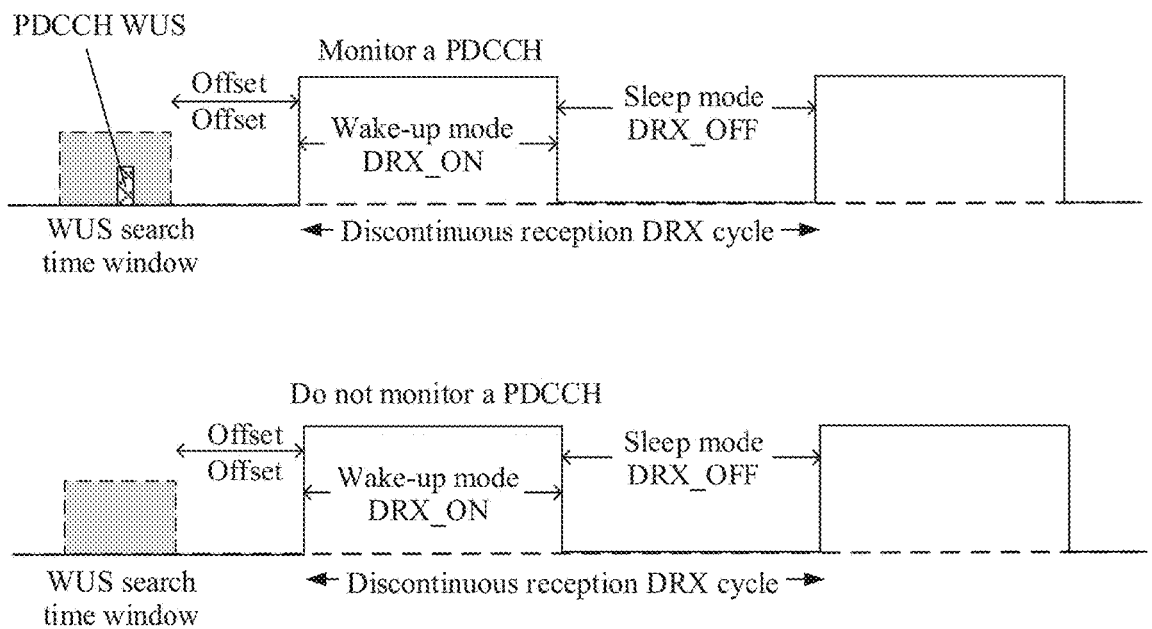
FIG. 5 is a schematic diagram showing that a monitoring occasion of a PDCCH WUS falls within a WUS search time window.

In discussion of the PDCCH WUS in 3GPP, it is determined that there is a time offset (offset) between a transmission time point of the PDCCH WUS and a start time point of DRX_On. However, a conclusion has not been made on a specific transmission time point of the WUS. A method for configuring the transmission time point of the WUS is as follows: A period of time prior to DRX_ON (for example, several specified time slots prior to DRX_ON) is specified as a WUS search time (which may also be referred to as a WUS search time window in this specification), as shown in FIG. 5. If the terminal device detects a PDCCH WUS within the WUS search time, the terminal device wakes up and monitors a PDCCH within a DRX_ON time period corresponding to the WUS search time. If the terminal device monitors no PDCCH WUS within the WUS search time, the terminal device continues to remain in the sleep state in the DRX_ON time period corresponding to the WUS search time, and does not monitor a PDCCH.

Currently, the WUS search time window and the search space set that are configured by the network device are independent of each other. To be specific, the terminal device determines that the WUS search time window depends only on a length of the time window, the time offset, and the start time point of DRX_ON, and the configuration of the WUS search time window is independent of the time period parameter configured in the search space set. In some cases, for example, when a length of the transmission periodicity of the search space set is greater than the length of the WUS search time window, the transmission occasion of the PDCCH WUS may fall outside the WUS search window, so that no transmission occasion of the PDCCH WUS exists in the WUS search window. Because no transmission occasion of the PDCCH WUS exists in the WUS search window, the terminal device cannot determine when to monitor the PDCCH WUS, and definitely cannot detect the WUS within the WUS search time window even if monitoring is performed. Therefore, when DRX_ON arrives, the terminal device does not know how to respond (the terminal device cannot determine whether to monitor a PDCCH), and data sending or receiving is delayed.

To avoid such a case, the network device needs to configure the transmission periodicity of the search space set to be less than or equal to the length of the WUS search time window, to ensure that the transmission occasion of the PDCCH WUS appears in the WUS search time window. However, this configuration requirement limits flexibility of the network device, especially in a group-based PDCCH-WUS case. Because the group-based WUS is configured for a group of UEs, there may be UE that needs to be woken up in each transmission periodicity of the search space set. If the transmission periodicity of the search space set is excessively short, the base station sends a large quantity of PDCCH WUSs. Consequently, a downlink air interface resource is occupied and excessive system overheads are caused.

In addition, in the prior art, when the terminal device performs BWP switch, there is a switch delay (BWP switch delay) time. Within the switch delay time, a radio frequency transceiver function of the terminal device is interrupted, and any data transceiver operation cannot be performed. Therefore, in this scenario, even if the terminal device may determine that the transmission occasion of the PDCCH WUS exists in the WUS search time window, if the transmission occasion of the PDCCH WUS falls within the switch delay time corresponding to BWP switch performed by the terminal device, the terminal device still cannot monitor whether the network device sends the PDCCH WUS within the WUS search time window. Therefore, when DRX_ON arrives, the terminal device still does not know how to respond (the terminal device cannot determine whether to monitor a PDCCH), and data sending or receiving is still delayed.

In another case, in the prior art, if the terminal device operates in a time division duplex (Time Division Duplex) mode, slots for communication of the terminal device may be classified into an uplink slot, a downlink slot, and the like. The uplink slot is used to send uplink data, uplink control signaling, a reference signal, and the like. The downlink slot is used to receive a synchronous broadcast channel, a downlink control channel, downlink data, a reference signal, and the like. Except for the uplink slot and the downlink slot, symbols in the other slots may be configured as an uplink symbol, a downlink symbol, and a flexible symbol (flexible symbol). The flexible symbol may be dynamically used for downlink receiving or uplink transmission based on an actual scheduling status, so that an uplink air interface capacity or a downlink air interface capacity can be flexibly adjusted. However, if the transmission occasion of the wake-up signal coincides with the flexible symbol, the flexible symbol needs to be used for downlink receiving to support sending of the wake-up signal. Therefore, flexibility of using the flexible symbol is reduced.

In view of this, the embodiments of the present invention provide a communication method. The method is used in the following scenario: When the terminal device cannot monitor the PDCCH WUS because no transmission occasion of the PDCCH WUS exists in the configured WUS search time window or BWP switch occurs, or when the transmission occasion of the wake-up signal coincides with the flexible symbol, the terminal device clearly knows behavior to be performed when DRX_ON arrives. To be specific, when DRX_ON arrives, the terminal device wakes up and monitors the PDCCH. On one hand, this can avoid the problem that data sending or receiving is delayed because the terminal device does not know the behavior to be performed when DRX_ON arrives. On the other hand, the network device may configure the transmission periodicity of the search space set to be greater than the length of the WUS search time window. When the network device sends the PDCCH WUS on the group-based PDCCH, downlink signaling overheads can be reduced. A specific implementation solution is described in detail hereinafter.

To make the embodiments of the present invention clearer, the following collectively describes some content and concepts related to the embodiments of the present invention.

(1) A terminal device is a device that provides a user with voice and/or data connectivity, for example, may be a handheld device with a wireless connection function, or a processing device connected to a wireless modem. The terminal device may communicate with a core network through a radio access network (radio access network, RAN), and exchange voice and/or data with the RAN. The terminal device may be user equipment (user equipment, UE), a wireless terminal device, a mobile terminal device, a device-to-device (device-to-device, D2D) terminal device, a V2X terminal device, a machine-to-machine/machine type communication (machine-to-machine/machine-type communications, M2M/MTC) terminal device, an internet of things (internet of things, IoT) terminal device, a subscriber unit (subscriber unit), a subscriber station (subscriber station), a mobile station (mobile station), a remote station (remote station), an access point (access point, AP), a remote terminal (remote terminal), an access terminal (access terminal), a user terminal (user terminal), a user agent (user agent), a user device (user device), or the like. For example, the terminal device may include a mobile phone (or referred to as a "cellular" phone), a computer with a mobile terminal device, a portable, pocket-sized, handheld, or computer built-in mobile apparatus, or the like. For example, the terminal device is a device such as a personal communication service (personal communication service, PCS) phone, a cordless phone, a session initiation protocol (session initiation protocol, SIP) phone, a wireless local loop (wireless local loop, WLL) station, or a personal digital assistant (personal digital assistant, PDA). The terminal device further includes a limited device, for example, a device with comparatively low power consumption, a device with a limited storage capability, or a device with a limited computing capability. For example, the terminal device includes an information sensing device such as a bar code device, a radio frequency identification (radio frequency identification, RFID) device, a sensor, a global positioning system (global positioning system, GPS), or a laser scanner.

By way of example but not limitation, in the embodiments of the present invention, the terminal device may be alternatively a wearable device. The wearable device may also be referred to as a wearable intelligent device, an intelligent wearable device, or the like. The wearable device is an umbrella term for devices that are developed by applying a wearable technology to perform intelligent design on daily wear, for example, glasses, gloves, a watch, clothes, and shoes. The wearable device is a portable device that is directly worn on the body or that is integrated into clothes or an accessory of a user. The wearable device is more than a hardware device, and implements powerful functions through software support, data exchange, and cloud interaction. In a broad sense, wearable intelligent devices include full-featured and large-sized devices that can implement all or some functions without depending on smartphones, for example, smart watches or smart glasses, and devices that focus on only one type of application function and need to work with another device such as a smartphone, for example, various smart bands, smart helmets, or smart jewelry for monitoring physical signs.

If the various terminal devices described above are on a vehicle (for example, placed in the vehicle or mounted on the vehicle), the terminal devices all may be considered as vehicle-mounted terminal devices. The vehicle-mounted terminal devices are also referred to as, for example, on-board units (on-board unit, OBU).

(2) A network device is, for example, an access network (access network, AN) device, a radio access network (radio access network, RAN) device. The access network device such as a base station (for example, an access point) may be a device, in an access network, that communicates with a wireless terminal device over an air interface through one or more cells. The base station may be configured to perform mutual conversion between a received over-the-air frame and a received internet protocol (IP) packet, and serve as a router between the terminal device and the remaining part of the access network, where the rest part of the access network may include an IP network. The network device may further coordinate attribute management of an air interface. For example, the network device may be an evolved NodeB (NodeB, eNB, or e-NodeB, evolved Node B) in a long term evolution (long term evolution, LTE) system or a long term evolution-advanced (long term evolution-advanced, LTE-A) system; or may be a next generation NodeB (next generation NodeB, gNB), a next generation evolved NodeB (next generation evolved NodeB, ng-eNB), or an enhanced next generation gNB en-gNB (enhanced next generation NodeB, gNB) in a 5th generation (5th generation, 5G) mobile communications technology new radio (new radio, NR) system; or may include a centralized unit (centralized unit, CU) and a distributed unit (distributed unit, DU) in a cloud access network (cloud radio access network, Cloud RAN) system, and may further include a relay device. This is not limited in the embodiments of the present invention.

In addition, in the embodiments of the present invention, the network device may further be a core network device. The core network device is, for example, a network device that processes and forwards signaling and data of a user. In a 4G system, the core network device is, for example, a mobility management entity (mobility management entity, MME). The MME is a key control node of an access network of an LTE system defined in the 3rd generation partnership project (3rd generation partnership project, 3GPP) protocol. The MME is responsible for a positioning and paging process and the like of a terminal device in an idle mode, where relaying is included. Briefly, the MME is a core network device responsible for signaling processing. In a 5G system, the core network device is, for example, a core network device such as an access management network element, a session management network element, or a user plane gateway. The user plane gateway may be a server that has functions such as mobility management, routing, and forwarding specific to user plane data. The user plane gateway, for example, the user plane gateway is a serving gateway (serving gateway, SGW), a packet data network gateway (packet data network gateway, PGW), or a user plane function (user plane function, UPF) is generally located on a network side.

(3) A time window refers to continuous duration, and the duration includes a start time point and an end time point. A length of the time window is a length from the start time point to the end time point. For example, a WUS time window in this application may be several slots prior to on duration.

(4) Bandwidth part (bandwidth part, BWP for short): In comparison with an LTE system, different bandwidths may be configured on a network side and a UE side in an NR system. The UE may configure a maximum operating bandwidth based on service requirements and manufacturing costs of the UE. For example, an operating bandwidth of low-cost and low-rate UE may be only 5 MHz, and an operating bandwidth of high-rate and high-performance UE may reach 100 MHz. If a carrier bandwidth of a cell is set based on a carrier bandwidth of the low-cost and low-rate UE (for example, the carrier bandwidth is set to 5 MHz to 10 MHz), the high-performance UE can obtain a comparatively high rate only through carrier aggregation (carrier aggregation), but this inevitably increases control signaling overheads and processing complexity. If a carrier bandwidth of a cell is set based on a carrier bandwidth of the high-rate and high-performance UE (for example, the carrier bandwidth is set to 100 MHz), the low-cost UE needs to be equipped with a radio frequency component and a baseband component that are specific to a large bandwidth, to access the cell. This inevitably increases costs. Therefore, the concept of BWP is introduced to NR.

A BWP is a segment of continuous frequency resources on a cell carrier, and a base station may configure BWPs of different bandwidths for different UEs. After a BWP is configured and activated, the BWP is referred to as an active BWP. UE is restricted to send uplink data and control information and receive downlink data and control information in the active BWP. In NR Release 15 protocol, one UE can correspond to only one active BWP.

(5) BWP switch: To enable UE to operate in different BWPs at different moments to receive and send data based on service requirements, NR may support the UE to perform BWP switch, that is, support the UE to switch from one BWP to another BWP.

Currently, the NR may support the following two manners of BWP switch:

Manner 1: UE is triggered to perform BWP switch in scheduling DCI. Generally, the scheduling DCI may be DCI format 1_1 for scheduling the UE to receive downlink PDSCH data, or may be DCI format 0_1 for scheduling the UE to send physical uplink shared channel (physical uplink shared channel, PUSCH) data. After receiving the scheduling DCI, the UE switches to a new BWP indicated by the DCI to receive or send data.

Manner 2. UE performs timer-based BWP switch. After the UE switches to a BWP, the UE starts a BWP-inactivity timer (BWP-inactivityTimer). Each time the UE receives scheduling (regardless of uplink scheduling or downlink scheduling), the UE restarts the timer. Once the BWP-inactivity timer expires, the UE switches back to a default BWP.

(6) Flexible symbol (flexible symbol) is a symbol resource that is not specified as an uplink slot, an uplink symbol, a downlink slot, or a downlink symbol when a base station configures a slot format for UE. The base station may configure a format of a segment of slots for the UE through RRC signaling (for example, common configuration higher layer signaling tdd-UL-DL-ConfigurationCommon or dedicated configuration higher layer signaling tdd-UL-DL-ConfigDedicated). Some of the segment of slots may be configured as uplink slots or downlink slots, some symbols in the remaining slots may be configured as uplink symbols or downlink symbols, and the other symbols that are not configured as the uplink symbols and the downlink symbols are considered as flexible symbols. Based on scheduling performed by the base station, the flexible symbol may be flexibly used for sending of uplink data, signaling, and a reference signal and may be flexibly used for receiving of downlink data, a control channel, and a reference signal.

(7) Terms "system" and "network" may be used interchangeably in the embodiments of this application. "At least one" means one or more, and "a plurality of" means two or more than two. The term "and/or" describes an association relationship between associated objects and may indicate three relationships. For example, A and/or B may indicate the following cases: Only A exists, both A and B exist, and only B exists, where A and B may be singular or plural. The character "/" generally indicates an "or" relationship between the associated objects. "At least one item (piece) of the following" or a similar expression thereof means any combination of these items, including any combination of singular items (pieces) or plural items (pieces). For example, at least one (one piece) of a, b, or c may indicate: a, b, c, a and b, a and c, b and c, a, b, or c, where a, b, and c may be singular or plural.

In addition, unless otherwise specified, ordinal numbers such as "first" and "second" in the embodiments of this application are used to distinguish between a plurality of objects, but are not intended to limit a sequence, a time sequence, priorities, or importance of the plurality of objects. For example, a first priority criterion and a second priority criterion are merely used to distinguish between different criteria, but do not indicate different content, priorities, importance, or the like of the two criteria.

In addition, the terms "include" and "have" in the embodiments, claims, and accompanying drawings of this application are not exclusive. For example, a process, method, system, product, or device including a series of steps or modules is not limited to the listed steps or modules, and may further include a step or module that is not listed.

The technical solutions in the embodiments of the present invention may be applicable to a 5G system, and may also be applicable to another wireless communications system, for example, a long term evolution (Long Term Evolution, LTE) system, a global system for mobile communications (Global System for Mobile Communications, GSM), a universal mobile communications system (Universal Mobile Telecommunications System, UMTS), a code division multiple access (Code Division Multiple Access, CDMA) system, and a new network device system.

Embodiment 1

Figure 7:
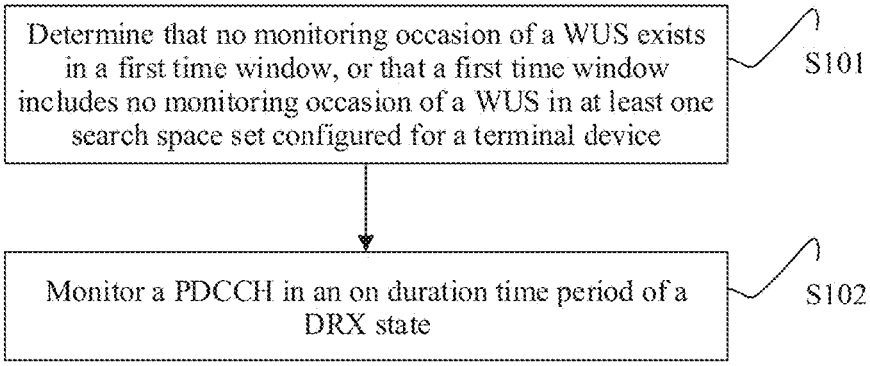
FIG. 7 is a flowchart of a communication method according to an embodiment of the present invention.

FIG. 7 is a flowchart of a communication method according to an embodiment of the present invention. The method includes the following steps.

S101: A terminal device determines that no monitoring occasion of a WUS exists in a first time window, or that a first time window includes no monitoring occasion of a WUS in at least one search space set configured for the terminal device.

S102: The terminal device monitors a PDCCH in an on duration time period of a DRX state.

The first time window is the WUS search time window described above, that is, a time window for monitoring the WUS. The WUS is the PDCCH-based WUS described above, that is, a signal indicates the terminal device to wake up and monitor the PDCCH in the on duration time period of the DRX state. The first time window is prior to the on duration time period. The WUS may be a UE-specific PDCCH WUS or a group-based WUS. This is not limited in this embodiment of the present invention.

The terminal device may determine a specific time location of the WUS search time window based on an end time point of the WUS search time window, an offset (offset) between the end time point of the WUS search time window and a start time point of DRX ON, and a length of the WUS search time window, where the specific time location of the WUS search time window is a start time point of the WUS search time window.

When the terminal device operates in a low frequency band and a high frequency band, conditions for determining, by the terminal device, whether to monitor the PDCCH within the DRX_On duration are different.

Figure 6:
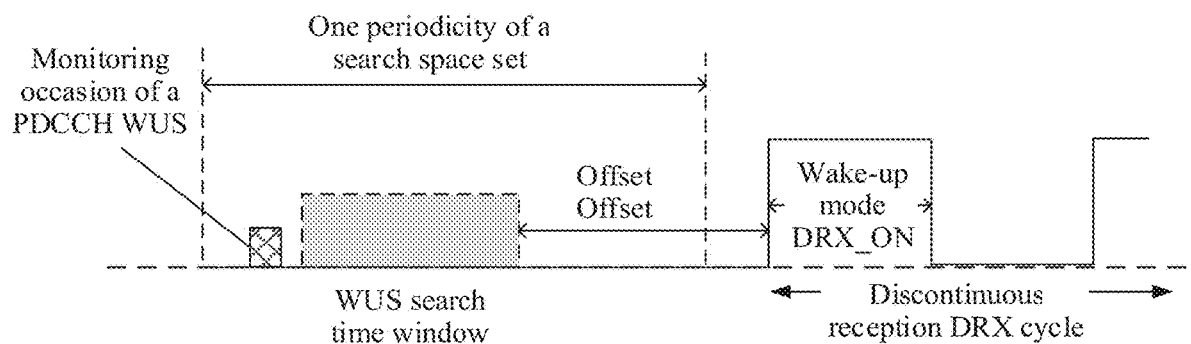
FIG. 6 is a schematic diagram showing that a monitoring occasion of a PDCCH WUS falls outside a WUS search time window.

In the case of the low frequency band, that is, when a network device sends a WUS through one search space set, if all monitoring occasions of the WUS fall outside the first time window (that is, the terminal device determines that no monitoring occasion of the WUS exists in the first time window), as shown in FIG. 6, when DRX_On arrives, the terminal device wakes up and monitors the PDCCH.

Figure 8:
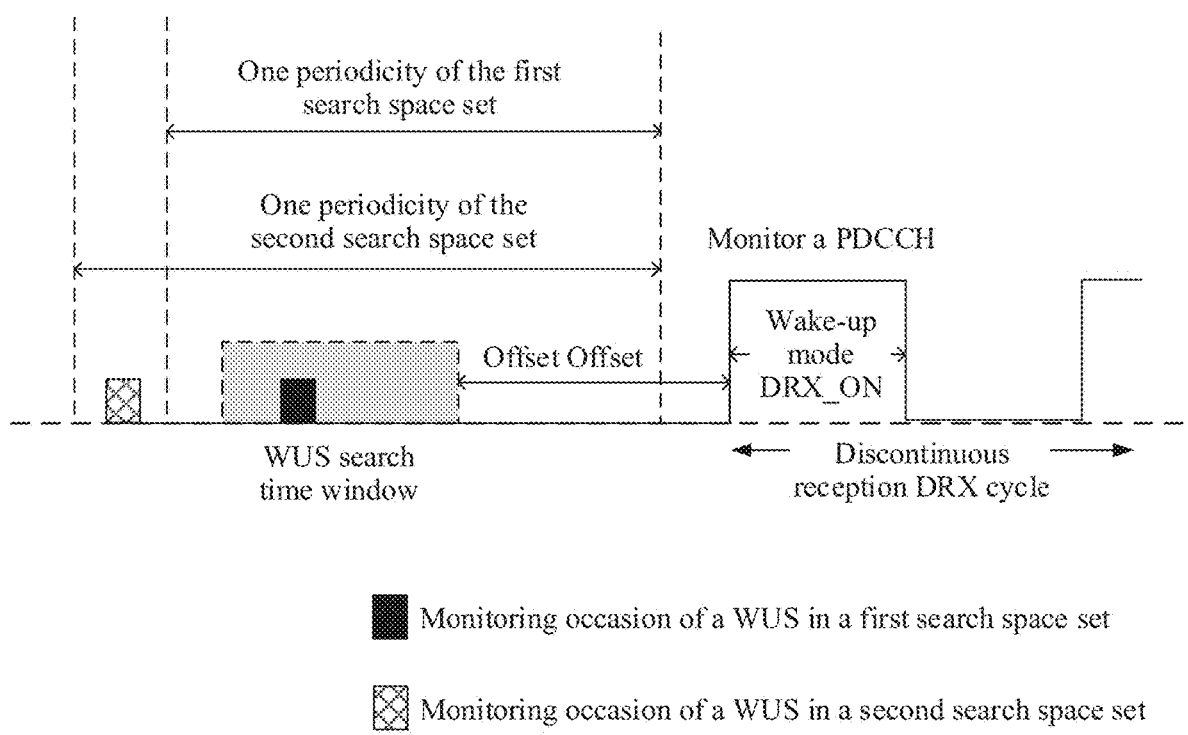
FIG. 8 is a schematic diagram of sending a WUS in two search space sets by a network device according to an embodiment of the present invention.

In the case of the high frequency band, that is, when the network device may send a WUS through a plurality of search space sets, if monitoring occasions of the WUS in some search space sets fall outside the first time window or monitoring occasions of the WUS in all of the search space sets fall outside the first time window (that is, the terminal device determines that the first time window includes no monitoring occasion of the WUS in the at least one search space set configured for the terminal device), when on duration of the discontinuous reception DRX state arrives, the terminal device wakes up and monitors a PDCCH. For example, referring to FIG. 8, two search space sets (a first search space set and a second search space set) are configured for the terminal device. A detection occasion of a WUS in the first search space set is within the WUS search time window, and a detection occasion of a WUS in the second search space set is outside the WUS search time window. In this case, when DRX_On arrives, the terminal device wakes up and monitors the PDCCH.

In this embodiment of the present invention, a duration length of one transmission periodicity of the search space set may be greater than a duration length of the WUS search time window.

Figure 9:
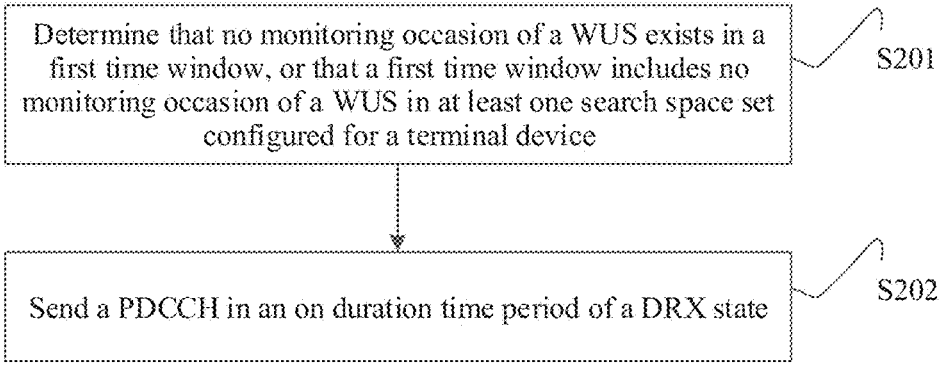
FIG. 9 is a flowchart of another communication method according to an embodiment of the present invention.

FIG. 9 is a flowchart of a method correspondingly performed on a network device side in the communication method shown in FIG. 7. The method includes the following steps.

S201: A network device determines that no monitoring occasion of a WUS exists in a first time window, or that a first time window includes no monitoring occasion of a WUS in at least one search space set configured for a terminal device.

S202: The network device sends a PDCCH in an on duration time period of a DRX state.

For a specific implementation in which the network device determines that no monitoring occasion of the WUS exists in the first time window, or that the first time window includes no monitoring occasion of the WUS in the at least one search space set configured for the terminal device, refer to the specific implementation in which the terminal device determines that no monitoring occasion of the WUS exists in the first time window, or that the first time window includes no monitoring occasion of the WUS in the at least one search space set configured for the terminal device in step S101. Details are not described herein again.

It should be understood that, in a specific implementation process, after the network device determines that no monitoring occasion of the wake-up signal exists in the first time window or that the first time window includes no monitoring occasion of the wake-up signal in the at least one search space set configured for the terminal device, the network device may alternatively not send the PDCCH in the on duration time period of the DRX state. However, for the terminal device, regardless of whether the network device sends the PDCCH in the on duration time period of the DRX state, the terminal device needs to wake up and monitor the PDCCH in the on duration time period of the DRX state.

In the foregoing solution, when no monitoring occasion of the WUS exists in the first time window or when the first time window includes no monitoring occasion of the WUS in the at least one search space set configured for the terminal device, the terminal device clearly knows behavior to be performed when DRX_ON arrives. To be specific, when DRX_ON arrives, the terminal device wakes up and monitors the PDCCH. On one hand, this can avoid a problem that data sending or receiving is delayed because the terminal device does not clearly know the behavior to be performed when DRX_ON arrives. On the other hand, the network device may configure a transmission periodicity of the search space set to be greater than a length of a WUS search time window. When the network device sends the PDCCH WUS on a group-based PDCCH, downlink signaling overheads can be reduced.

Embodiment 2

Figure 10:
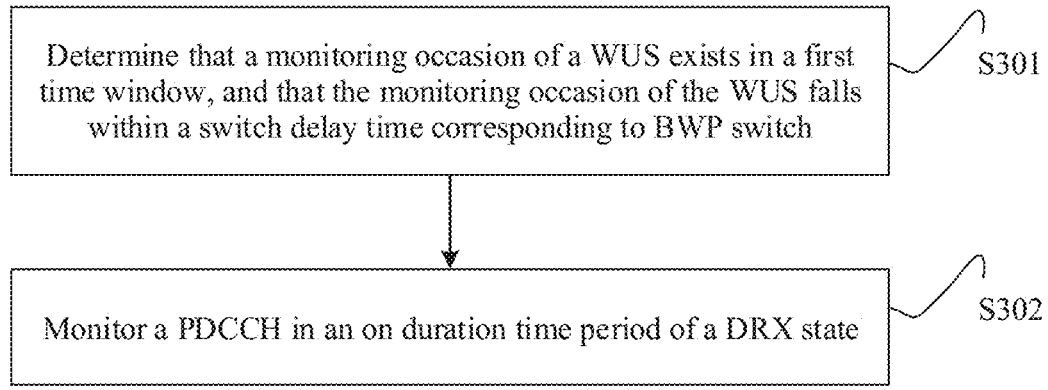
FIG. 10 is a flowchart of another communication method according to an embodiment of the present invention.

FIG. 10 is a flowchart of another communication method according to an embodiment of the present invention. The method includes the following steps.

S301: A terminal device determines that a monitoring occasion of a WUS exists in a first time window, and that the monitoring occasion of the WUS falls within a switch delay time corresponding to BWP switch.

S302: The terminal device monitors a PDCCH in an on duration time period of a DRX state.

The first time window is the WUS search time window described above, that is, a time window for monitoring the WUS. The WUS is the PDCCH-based WUS described above, that is, a signal indicates the terminal device to wake up and monitor the PDCCH in the on duration time period of the DRX state. The first time window is prior to the on duration time period. The WUS may be a UE-specific PDCCH WUS or a group-based WUS. This is not limited in this embodiment of the present invention.

The terminal device may determine a specific time location of the WUS search time window based on an end time point of the WUS search time window, an offset (offset) between the end time point of the WUS search time window and a start time point of DRX ON, and a length of the WUS search time window, where the specific time location of the WUS search time window is a start time point of the WUS search time window.

In this embodiment of the present invention, the terminal device may be triggered to perform BWP switch in the following manner: A network device triggers, through scheduling DCI, the terminal device to perform BWP switch, or the terminal device is triggered to perform BWP switch when a BWP-inactivity timer of the terminal device expires. This is not specifically limited in this embodiment of the present invention.

In this embodiment of the present invention, the terminal device monitors the PDCCH in the on duration time period of the DRX state in the at least two following scenarios.

Scenario 1:

The terminal device switches from a first BWP of a first cell to a second BWP of the first cell, a monitoring occasion of the WUS configured in the second BWP exists in the first time window, and a DRX mechanism is configured in the second BWP. In addition, the monitoring occasion of the WUS configured in the second BWP falls within a corresponding switch delay time when the terminal device switches from the first BWP to the second BWP. In this case, the terminal device monitors the PDCCH in an on duration time period of a DRX state configured in the second BWP.

Figure 11:
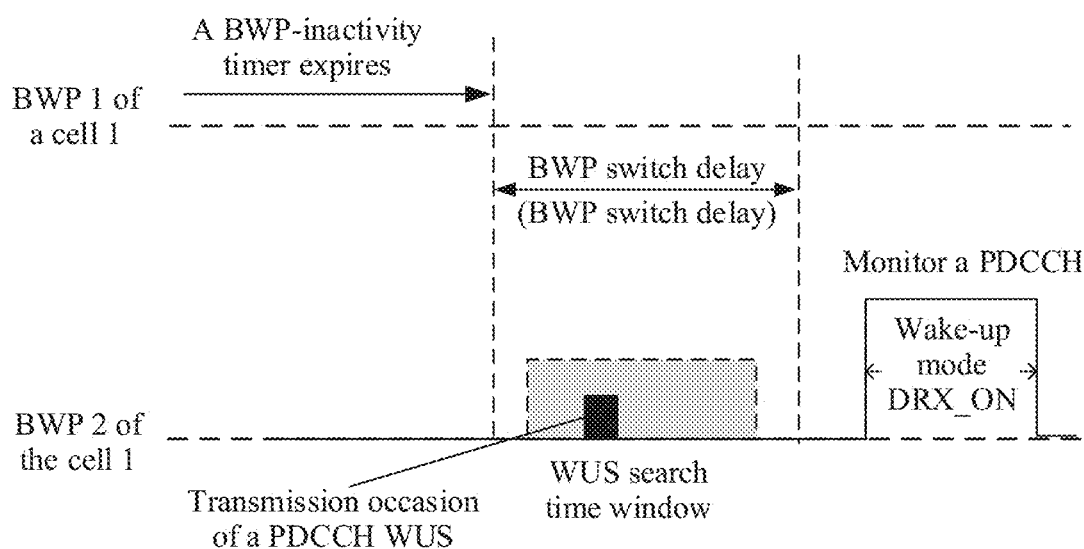
FIG. 11 is a schematic diagram of a BWP switch scenario according to an embodiment of the present invention.

For example, referring to FIG. 11, the terminal device switches a BWP of a cell 1 from a BWP 1 to a BWP 2, and a DRX mechanism is configured in the BWP 2. A monitoring occasion of a WUS configured in the second BWP exists in a WUS search time window configured in the BWP 2, a switch delay (BWP switch delay) time corresponding to BWP switch coincides with the WUS search time window, and the monitoring occasion of the WUS configured in the second BWP falls within the switch delay time. Although the terminal device cannot monitor the WUS because a radio frequency transceiver function is interrupted in the WUS search time window due to the BWP switch, when subsequent DRX_ON arrives, the terminal device wakes up and monitors the PDCCH.

It should be noted that in Scenario 1, there may be one or more serving cells of the terminal device (for example, the terminal device has both a primary serving cell and a secondary serving cell). This is not specifically limited in this embodiment of the present invention. When the BWP switch occurs in any cell of the terminal device, the terminal device performs the method steps S301 and S302 in the cell.

Scenario 2:

The terminal device switches from a first BWP of a first cell to a second BWP of the first cell, a monitoring occasion of a wake-up signal configured in a BWP of a second cell exists in a first time window, and the monitoring occasion of the wake-up signal configured in the BWP of the second cell, falls within a corresponding switch delay time when the terminal device switches from the first BWP to the second BWP. In this case, the terminal device monitors the PDCCH in the on duration time period of the DRX state configured in the BWP of the second cell.

Figure 12:
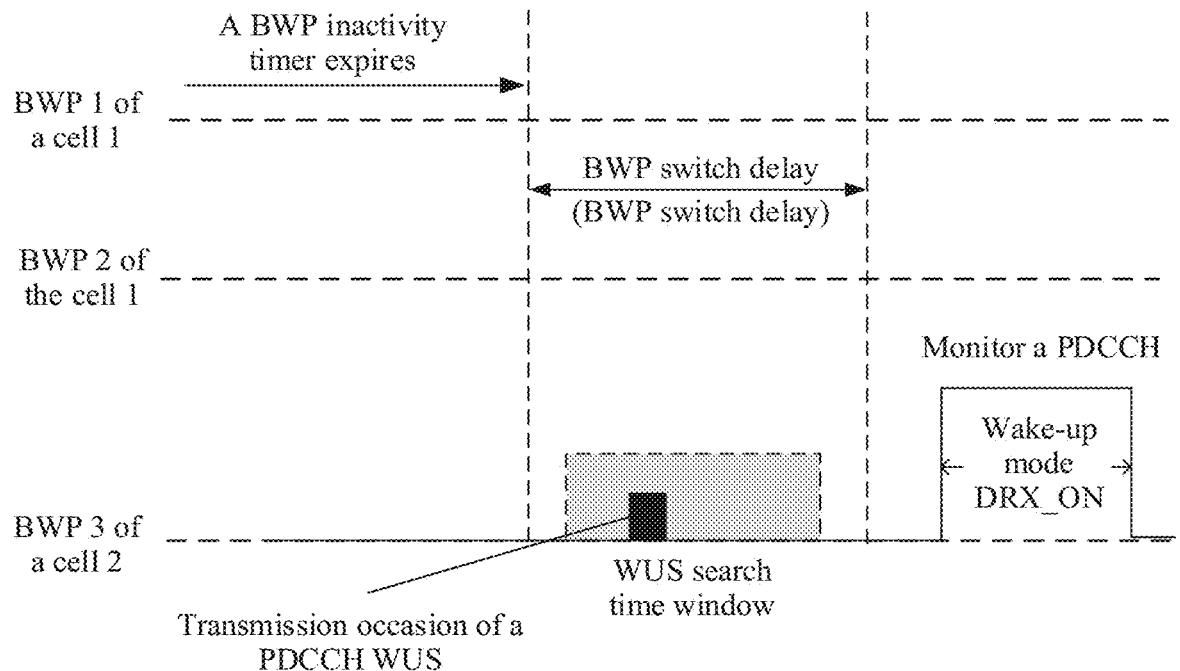
FIG. 12 is a schematic diagram of another BWP switch scenario according to an embodiment of the present invention.

For example, referring to FIG. 12, a BWP 1 and a BWP 2 are configured for a cell 1 of the terminal device, and the terminal device switches a BWP of the cell 1 from the BWP 1 to the BWP 2. A BWP 3 is configured for a cell 2 of the terminal device, a DRX mechanism is configured in the BWP 3, a monitoring occasion of a WUS exists within a WUS search time configured in the BWP 3, a switch delay (BWP switch delay) time corresponding to BWP switch coincides with the WUS search time window, and the monitoring occasion of the WUS configured in the BWP 3 exactly falls within the switch delay time. In this case, if the cell 1 and the cell 2 use a same RF link, a radio frequency transceiver function of the cell 2 is interrupted within the WUS search time window, and the terminal device cannot monitor the WUS. However, when DRX_ON arrives, the terminal device wakes up and monitors the PDCCH in the BWP 3 of the cell 2.

It should be noted that in Scenario 2, the foregoing two serving cells of the terminal device are merely examples, and the quantity of the serving cells is not limited, provided that other cells of a plurality of cells that share a same radio frequency link can perform the method performed by the second cell when one of the plurality of cells, for example, the first cell, performs BWP switch.

Figure 13:
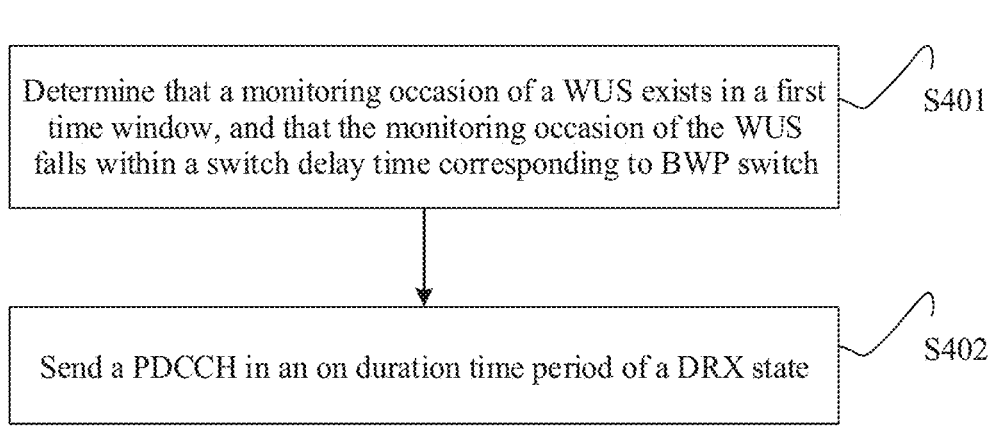
FIG. 13 is a flowchart of another communication method according to an embodiment of the present invention.

FIG. 13 is a flowchart of a method correspondingly performed on a network device side in the communication method shown in FIG. 10. The method includes the following steps.

S401: A network device determines that a monitoring occasion of a WUS exists in a first time window, and that the monitoring occasion of the WUS falls within a switch delay time corresponding to BWP switch.

S402: The network device sends a PDCCH in an on duration time period of a DRX state.

For a specific implementation in which the network device determines that the monitoring occasion of the WUS exists in the first time window, and that the monitoring occasion of the WUS falls within the switch delay time corresponding to BWP switch, refer to a specific implementation in which the terminal device determines that the monitoring occasion of the WUS exists in the first time window, and that the monitoring occasion of the WUS falls within the switch delay time corresponding to BWP switch in step S301. Details are not described herein again.

It should be understood that, in a specific implementation process, after the network device determines that the monitoring occasion of the WUS exists in the first time window, and that the monitoring occasion of the WUS falls within the switch delay time corresponding to BWP switch, the network device may alternatively not send the PDCCH in the on duration time period of the DRX state. However, for the terminal device, regardless of whether the network device sends the PDCCH in the on duration time period of the DRX state, the terminal device needs to wake up and monitor the PDCCH in the on duration time period of the DRX state.

In the foregoing solution, when the terminal device cannot monitor the WUS due to the BWP switch, the terminal device clearly knows behavior to be performed when DRX_ON arrives. To be specific, when DRX_ON arrives, the terminal device wakes up and monitors the PDCCH. This can avoid a problem that data sending or receiving is delayed because the terminal device does not clearly know the behavior to be performed when DRX_ON arrives.

Embodiment 3

Figure 22:
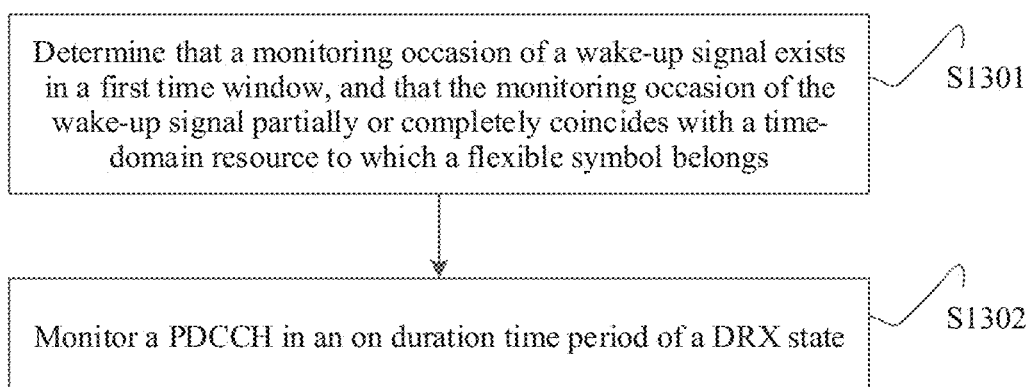
FIG. 22 is a flowchart of another communication method according to an embodiment of the present invention.

FIG. 22 is a flowchart of another communication method according to an embodiment of the present invention. The method includes the following steps.

S1301: A terminal device determines that a monitoring occasion of a wake-up signal exists in a first time window, and that the monitoring occasion of the wake-up signal partially or completely coincides with a time-domain resource to which a flexible symbol belongs.

For example, some or all symbols of a search space set that are used to send the WUS are within flexible symbols, or some or all symbols of the flexible symbols are within the monitoring occasion of the WUS. This is not specifically limited in this embodiment of the present invention.

In this embodiment of the present invention, the flexible symbol may be a flexible symbol configured by a network device through common configuration higher layer signaling tdd-UL-DL-ConfigurationCommon or dedicated configuration higher layer signaling tdd-UL-DL-ConfigurationDedicated. This is not specifically limited in this embodiment of the present invention. The flexible symbol may be measured in a frame, a subframe, a slot, or a symbol. This is not specifically limited in this embodiment of the present invention. Optionally, the network device may dynamically indicate the flexible symbol in DCI format 2_0.

S1302. The terminal device monitors a PDCCH in an on duration time period of a DRX state.

The first time window is the WUS search time window described above, that is, a time window for monitoring the WUS. The WUS is the PDCCH-based WUS described above, that is, a signal indicates the terminal device to wake up and monitor the PDCCH in the on duration time period of the DRX state. The first time window is prior to the on duration time period. The WUS may be a UE-specific PDCCH WUS or a group-based WUS. This is not limited in this embodiment of the present invention.

The terminal device may determine a specific time location of the WUS search time window based on an end time point of the WUS search time window, an offset (offset) between the end time point of the WUS search time window and a start time point of DRX ON, and a length of the WUS search time window, where the specific time location of the WUS search time window is a start time point of the WUS search time window.

Figure 23:
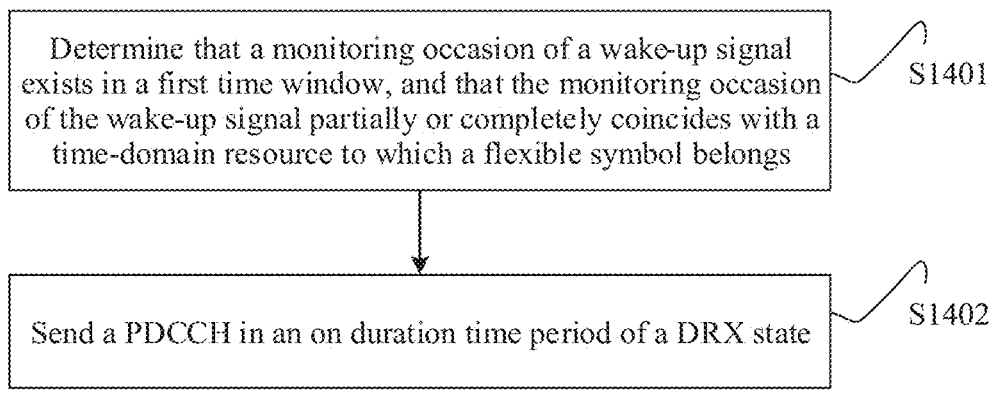
FIG. 23 is a flowchart of another communication method according to an embodiment of the present invention.

FIG. 23 is a flowchart of a method correspondingly performed on a network device side in the communication method shown in FIG. 22. The method includes the following steps.

S1401: A network device determines that a monitoring occasion of a wake-up signal exists in a first time window, and that the monitoring occasion of the wake-up signal partially or completely coincides with a time-domain resource to which a flexible symbol belongs.

For a specific implementation in which the network device determines that the monitoring occasion of the WUS exists in the first time window, and that the monitoring occasion of the WUS coincides with a time-frequency domain area in which the flexible symbol is located, refer to a specific implementation in which the terminal device determines that the monitoring occasion of the WUS exists in the first time window, and that the monitoring occasion of the WUS coincides with a time-frequency domain area in which the flexible symbol is located in step S1301. Details are not described herein again.

S1402: The network device sends a PDCCH in an on duration time period of a DRX state.

It should be understood that, in a specific implementation process, after the network device determines that the monitoring occasion of the WUS exists in the first time window, and that the monitoring occasion of the WUS coincides with the time-frequency domain area in which the flexible symbol is located, the network device may alternatively not send the PDCCH in the on duration time period of the DRX state. However, for the terminal device, regardless of whether the network device sends the PDCCH in the on duration time period of the DRX state, the terminal device needs to wake up and monitor the PDCCH in the on duration time period of the DRX state.

In the foregoing solution, when the monitoring occasion of the wake-up signal coincides with the time-domain resource of the flexible symbol, the terminal device clearly knows that the flexible symbol cannot be occupied by the WUS, and is fixed as a downlink symbol. In addition, the terminal device clearly knows behavior of the terminal device to be performed in the on duration time period after the monitoring occasion of the wake-up signal coincides with the time-frequency resource in which the flexible symbol is located. To be specific, when on duration following the flexible symbol arrives, the terminal device wakes up and monitors the PDCCH. In this way, the flexible symbol may be flexibly used for uplink or downlink transmission, to avoid a problem that data sending or receiving is delayed because the terminal device does not know the behavior to be performed when on duration arrives.

Based on a same technical concept, a communications apparatus is further provided. The communications apparatus is, for example, a terminal device. The communications apparatus has functions of implementing the terminal device in the method designs. The functions may be implemented by hardware, or may be implemented by hardware executing corresponding software. The hardware or the software includes one or more units corresponding to the foregoing functions.

Figure 14:
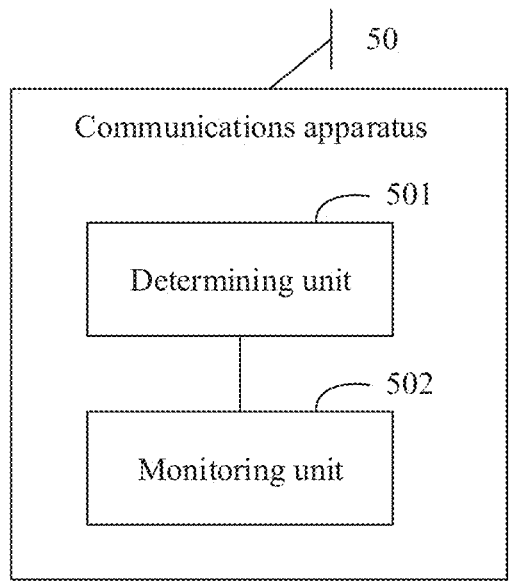
FIG. 14 is a schematic structural diagram of a communications apparatus according to an embodiment of the present invention.

For example, referring to FIG. 14, a communications apparatus 50 includes: a determining unit 501, configured to determine whether a monitoring occasion of a wake-up signal exists in a first time window, or whether a first time window includes a monitoring occasion of a wake-up signal in at least one search space set configured for a terminal device; and a monitoring unit 502, configured to: when no monitoring occasion of the wake-up signal exists in the first time window, or the first time window includes no monitoring occasion of the wake-up signal in the at least one search space set configured for the terminal device, monitor a physical downlink control channel within an on duration time period of a discontinuous reception DRX state, where the first time window is a time window for monitoring the wake-up signal, the wake-up signal indicates the terminal device to monitor the physical downlink control channel within the on duration time period, and the first time window is prior to the on duration time period.

In a possible design, the wake-up signal is a user equipment-specific physical downlink control channel wake-up signal UE-specific PDCCH WUS or a group-based wake-up signal group-based WUS.

All related content of the steps in the foregoing method embodiment may be cited in functional descriptions of the corresponding functional modules. Details are not described herein again.

Based on a same technical concept, a communications apparatus is further provided. The communications apparatus is, for example, a network device. The communications apparatus has functions of implementing the network device in the method designs. The functions may be implemented by hardware, or may be implemented by hardware executing corresponding software. The hardware or the software includes one or more units corresponding to the foregoing functions.

Figure 15:
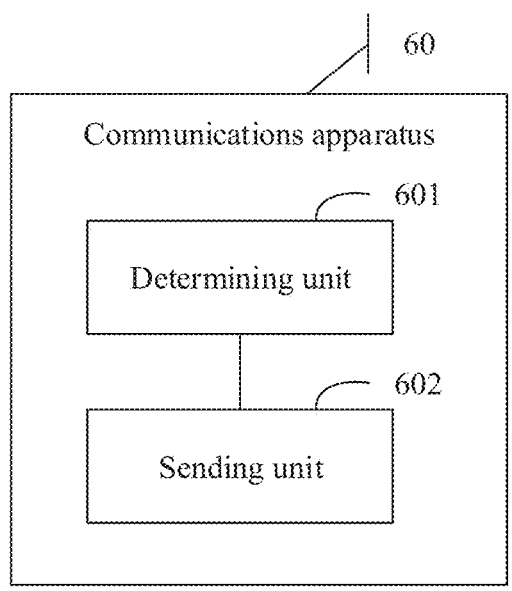
FIG. 15 is a schematic structural diagram of another communications apparatus according to an embodiment of the present invention.

For example, referring to FIG. 15, a communications apparatus 60 includes: a determining unit 601, configured to determine whether a monitoring occasion of a wake-up signal exists in a first time window, or whether a first time window includes a monitoring occasion of a wake-up signal in at least one search space set configured for a terminal device; and a sending unit 602, configured to: when no monitoring occasion of the wake-up signal exists in the first time window, or the first time window includes no monitoring occasion of the wake-up signal in the at least one search space set configured for the terminal device, send a physical downlink control channel within an on duration time period of a discontinuous reception DRX state, where the first time window is a time window for monitoring the wake-up signal, the wake-up signal indicates the terminal device to monitor the physical downlink control channel within the on duration time period, and the first time window is prior to the on duration time period.

In a possible design, the wake-up signal is a user equipment-specific physical downlink control channel wake-up signal UE-specific PDCCH WUS or a group-based wake-up signal group-based WUS.

All related content of the steps in the foregoing method embodiment may be cited in functional descriptions of the corresponding functional modules. Details are not described herein again.

Based on a same technical concept, a communications apparatus is further provided. The communications apparatus is, for example, a terminal device. The communications apparatus has functions of implementing the terminal device in the method designs. The functions may be implemented by hardware, or may be implemented by hardware executing corresponding software. The hardware or the software includes one or more units corresponding to the foregoing functions.

Figure 16:
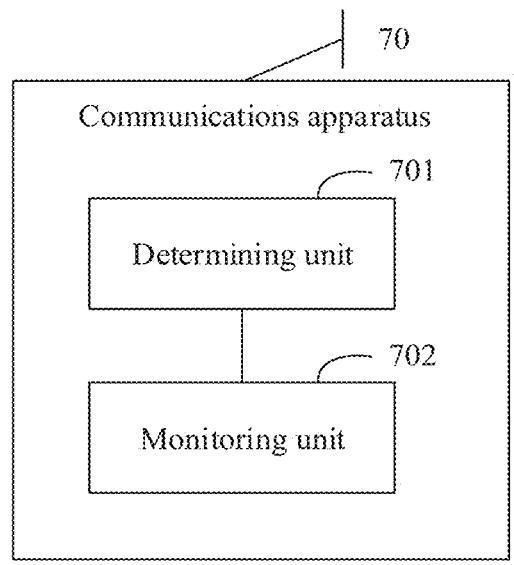
FIG. 16 is a schematic structural diagram of another communications apparatus according to an embodiment of the present invention.

For example, referring to FIG. 16, a communications apparatus 70 includes: a determining unit 701, configured to determine whether a monitoring occasion of a wake-up signal exists in a first time window, and whether the monitoring occasion of the wake-up signal falls within a switch delay time corresponding to BWP switch; and a monitoring unit 702, configured to: when the monitoring occasion of the wake-up signal exists in the first time window, and the monitoring occasion of the wake-up signal falls within the switch delay time corresponding to BWP switch, monitor a physical downlink control channel within an on duration time period of a discontinuous reception DRX state, where the first time window is a time window for monitoring the wake-up signal, the wake-up signal indicates a terminal device to monitor the physical downlink control channel within the on duration time period, and the first time window is prior to the on duration time period.

In a possible design, the BWP switch includes switching from a first BWP of a first cell to a second BWP of the first cell; that a monitoring occasion of a wake-up signal exists in a first time window includes: a monitoring occasion of a wake-up signal configured in the second BWP exists in the first time window; and the monitoring unit 702 is specifically configured to: monitor the physical downlink control channel within an on duration time period of a DRX state configured in the second BWP.

In a possible design, the BWP switch includes switching from a first BWP of a first cell to a second BWP of the first cell; that a monitoring occasion of a wake-up signal exists in a first time window includes: a monitoring occasion of a wake-up signal configured in a BWP of a second cell exists in the first time window; and the monitoring unit 702 is specifically configured to: monitor the physical downlink control channel within an on duration time period of a DRX state configured in the BWP of the second cell.

In a possible design, the wake-up signal is a user equipment-specific physical downlink control channel wake-up signal UE-specific PDCCH WUS or a group-based wake-up signal group-based WUS.

All related content of the steps in the foregoing method embodiment may be cited in functional descriptions of the corresponding functional modules. Details are not described herein again.

Based on a same technical concept, a communications apparatus is further provided. The communications apparatus is, for example, a network device. The communications apparatus has functions of implementing the network device in the method designs. The functions may be implemented by hardware, or may be implemented by hardware executing corresponding software. The hardware or the software includes one or more units corresponding to the foregoing functions.

Figure 17:
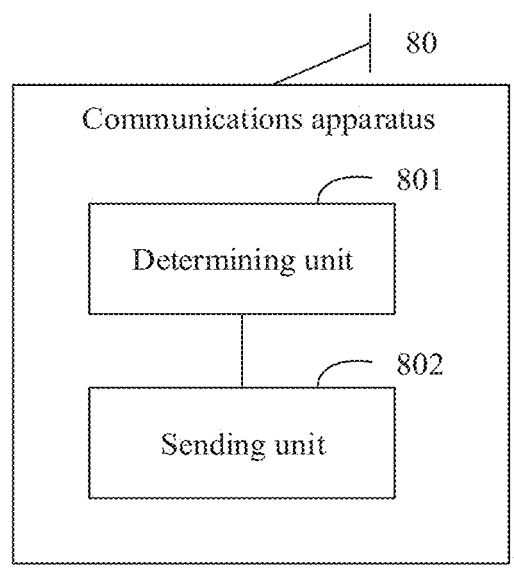
FIG. 17 is a schematic structural diagram of another communications apparatus according to an embodiment of the present invention.

For example, referring to FIG. 17, a communications apparatus 80 includes: a determining unit 801, configured to determine whether a monitoring occasion of a wake-up signal exists in a first time window, and whether the monitoring occasion of the wake-up signal falls within a switch delay time corresponding to BWP switch; and a sending unit 802, configured to: when the monitoring occasion of the wake-up signal exists in the first time window, and the monitoring occasion of the wake-up signal falls within the switch delay time corresponding to BWP switch, send a physical downlink control channel within an on duration time period of a discontinuous reception DRX state, where the first time window is a time window for monitoring the wake-up signal, the wake-up signal indicates a terminal device to monitor the physical downlink control channel within the on duration time period, and the first time window is prior to the on duration time period.

In a possible design, the BWP switch includes switching from a first BWP of a first cell to a second BWP of the first cell; that a monitoring occasion of a wake-up signal exists in a first time window includes: a monitoring occasion of a wake-up signal configured in the second BWP exists in the first time window; and the sending unit 802 is specifically configured to: send the physical downlink control channel within an on duration time period of a DRX state configured in the second BWP.

In a possible design, the BWP switch includes switching from a first BWP of a first cell to a second BWP of the first cell; that a monitoring occasion of a wake-up signal exists in a first time window includes: a monitoring occasion of a wake-up signal configured in a BWP of a second cell exists in the first time window; and the sending unit 802 is specifically configured to: send the physical downlink control channel within an on duration time period of a DRX state configured in the BWP of the second cell.

In a possible design, the wake-up signal is a user equipment-specific physical downlink control channel wake-up signal UE-specific PDCCH WUS or a group-based wake-up signal group-based WUS.

All related content of the steps in the foregoing method embodiment may be cited in functional descriptions of the corresponding functional modules. Details are not described herein again.

Based on a same technical concept, a communications apparatus is further provided. The communications apparatus is, for example, a terminal device. The communications apparatus has functions of implementing the terminal device in the method designs. The functions may be implemented by hardware, or may be implemented by hardware executing corresponding software. The hardware or the software includes one or more units corresponding to the foregoing functions.

Figure 24:
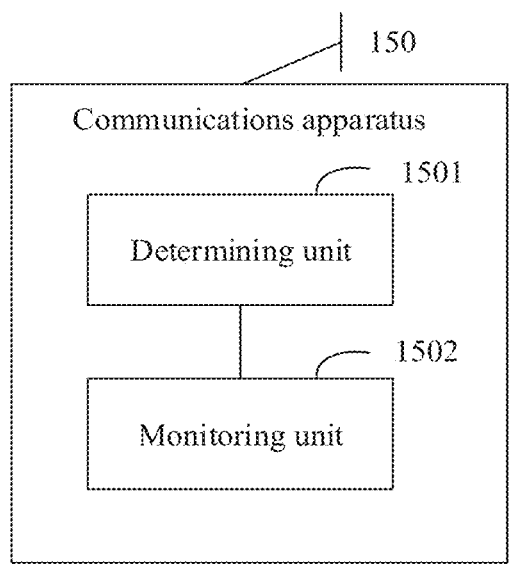
FIG. 24 is a schematic structural diagram of another communications apparatus according to an embodiment of the present invention.

Referring to FIG. 24, a communications apparatus 150 includes:

a determining unit 1501, configured to determine whether a monitoring occasion of a wake-up signal exists in a first time window, and whether the monitoring occasion of the wake-up signal partially or completely coincides with a time-domain resource to which a flexible symbol flexible symbol belongs; and a monitoring unit 1502, configured to: when the monitoring occasion of the wake-up signal exists in the first time window, and the monitoring occasion of the wake-up signal partially or completely coincides with the time-domain resource to which the flexible symbol belongs, monitor a physical downlink control channel within an on duration time period of a discontinuous reception DRX state, where the first time window is a time window for monitoring the wake-up signal, the wake-up signal indicates a terminal device to monitor the physical downlink control channel within the on duration time period, and the first time window is prior to the on duration time period.

In a possible design, the wake-up signal is a user equipment-specific physical downlink control channel wake-up signal UE-specific PDCCH WUS or a group-based wake-up signal group-based WUS.

In a possible design, the flexible symbol includes at least one of a frame, a subframe, a slot, or a symbol configured through common configuration signaling or dedicated configuration signaling.

All related content of the steps in the foregoing method embodiment may be cited in functional descriptions of the corresponding functional modules. Details are not described herein again.

Based on a same technical concept, a communications apparatus is further provided. The communications apparatus is, for example, a network device. The communications apparatus has functions of implementing the network device in the method designs. The functions may be implemented by hardware, or may be implemented by hardware executing corresponding software. The hardware or the software includes one or more units corresponding to the foregoing functions.

Figure 25:
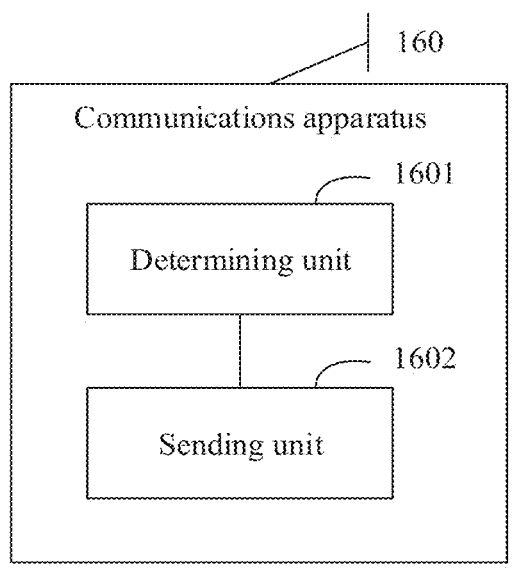
FIG. 25 is a schematic structural diagram of another communications apparatus according to an embodiment of the present invention.

Referring to FIG. 25, a communications apparatus 160 includes:

a determining unit 1601, configured to determine whether a monitoring occasion of a wake-up signal exists in a first time window, and whether the monitoring occasion of the wake-up signal partially or completely coincides with a time-domain resource to which a flexible symbol flexible symbol belongs; and a sending unit 1602, configured to: when the monitoring occasion of the wake-up signal exists in the first time window, and the monitoring occasion of the wake-up signal partially or completely coincides with a time-domain resource to which a flexible symbol belongs, send a physical downlink control channel within an on duration time period of a discontinuous reception DRX state, where the first time window is a time window for monitoring the wake-up signal, the wake-up signal indicates a terminal device to monitor the physical downlink control channel within the on duration time period, and the first time window is prior to the on duration time period.

In a possible design, the wake-up signal is a user equipment-specific physical downlink control channel wake-up signal UE-specific PDCCH WUS or a group-based wake-up signal group-based WUS.

In a possible design, the flexible symbol includes at least one of a frame, a subframe, a slot, or a symbol configured through common configuration signaling or dedicated configuration signaling.

All related content of the steps in the foregoing method embodiment may be cited in functional descriptions of the corresponding functional modules. Details are not described herein again.

Based on a same technical concept, a communications apparatus is further provided. The communications apparatus is, for example, a terminal device. The communications apparatus has functions of implementing the terminal device in the method designs. The functions may be implemented by hardware, or may be implemented by hardware executing corresponding software. The hardware or the software includes one or more units corresponding to the foregoing functions.

Figure 18:
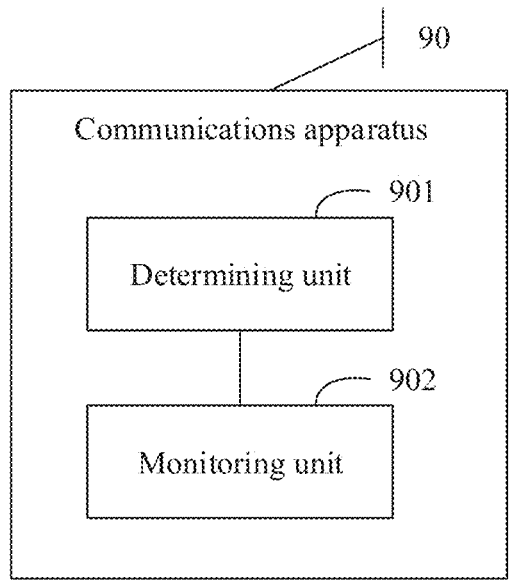
FIG. 18 is a schematic structural diagram of another communications apparatus according to an embodiment of the present invention.

For example, referring to FIG. 18, a communications apparatus 90 includes: a determining unit 901, configured to determine whether a terminal device can monitor a wake-up signal in a first time window; and a monitoring unit 902, configured to: when the terminal device cannot monitor the wake-up signal in the first time window, monitor a physical downlink control channel in an on duration time period of a discontinuous reception DRX state, where the first time window is a time window for monitoring the wake-up signal, the wake-up signal indicates the terminal device to monitor the physical downlink control channel within the on duration time period, and the first time window is prior to the on duration time period.

In a possible design, there are at least the following three reasons why the terminal device cannot monitor the WUS in the first time window. Reason 1: No monitoring occasion of the wake-up signal exists in the first time window. Reason 2: The first time window includes no monitoring occasion of the wake-up signal in at least one search space set configured for the terminal device. Reason 3: The monitoring occasion of the wake-up signal exists in the first time window, and the monitoring occasion of the wake-up signal falls within a switch delay time corresponding to BWP switch. Reason 4: The monitoring occasion of the wake-up signal exists in the first time window, and the monitoring occasion of the wake-up signal partially or completely coincides with a time-domain resource to which a flexible symbol flexible symbol belongs.

In a possible design, the wake-up signal is a user equipment-specific physical downlink control channel wake-up signal UE-specific PDCCH WUS or a group-based wake-up signal group-based WUS. This is not limited herein.

In a possible design, the BWP switch may include switching from a first BWP of a first cell to a second BWP of the first cell. Correspondingly, that a monitoring occasion of a wake-up signal exists in a first time window includes: a monitoring occasion of a wake-up signal configured in the second BWP exists in the first time window; and the monitoring unit 902 is configured to: monitor the physical downlink control channel within an on duration time period of a DRX state configured in the second BWP.

In another possible design, the BWP switch includes switching from a first BWP of a first cell to a second BWP of the first cell. Correspondingly, that a monitoring occasion of a wake-up signal exists in a first time window includes: a monitoring occasion of a wake-up signal configured in a BWP of a second cell exists in the first time window; and the monitoring unit 902 is configured to: monitor the physical downlink control channel within an on duration time period of a DRX state configured in the BWP of the second cell.

All related content of the steps in the foregoing method embodiment may be cited in functional descriptions of the corresponding functional modules. Details are not described herein again.

Based on a same technical concept, a communications apparatus is further provided. The communications apparatus is, for example, a network device. The communications apparatus has functions of implementing the network device in the method designs. The functions may be implemented by hardware, or may be implemented by hardware executing corresponding software. The hardware or the software includes one or more units corresponding to the foregoing functions.

Figure 19:
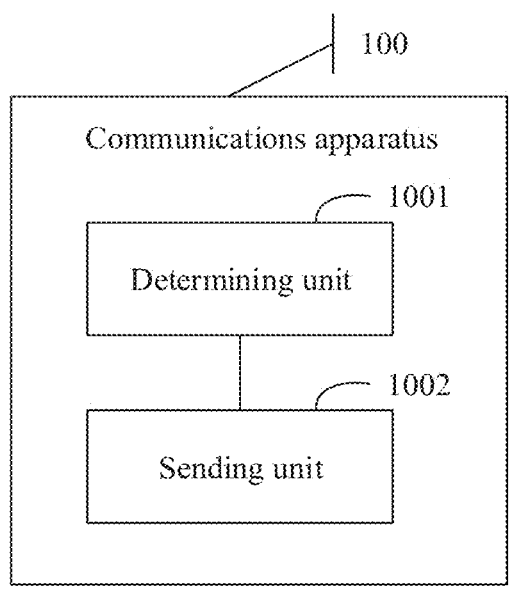
FIG. 19 is a schematic structural diagram of another communications apparatus according to an embodiment of the present invention.

For example, referring to FIG. 19, a communications apparatus 100 includes: a determining unit 1001, configured to determine whether a terminal device can monitor a wake-up signal in a first time window; and a sending unit 1002, configured to: when the terminal device cannot monitor the wake-up signal in the first time window, send a physical downlink control channel in an on duration time period of a discontinuous reception DRX state, where the first time window is a time window for monitoring the wake-up signal, the wake-up signal indicates the terminal device to monitor the physical downlink control channel within the on duration time period, and the first time window is prior to the on duration time period.

In a possible design, there are at least the following three reasons why the terminal device cannot monitor the WUS in the first time window. Reason 1: No monitoring occasion of the wake-up signal exists in the first time window. Reason 2: The first time window includes no monitoring occasion of the wake-up signal in at least one search space set configured for the terminal device. Reason 3: The monitoring occasion of the wake-up signal exists in the first time window, and the monitoring occasion of the wake-up signal falls within a switch delay time corresponding to BWP switch.

In a possible design, the wake-up signal is a user equipment-specific physical downlink control channel wake-up signal UE-specific PDCCH WUS or a group-based wake-up signal group-based WUS. This is not limited herein.

In a possible design, the BWP switch may include switching from a first BWP of a first cell to a second BWP of the first cell. Correspondingly, that a monitoring occasion of a wake-up signal exists in a first time window includes: a monitoring occasion of a wake-up signal configured in the second BWP exists in the first time window; and the sending unit 1002 is configured to: send the physical downlink control channel within an on duration time period of a DRX state configured in the second BWP.

In another possible design, the BWP switch includes switching from a first BWP of a first cell to a second BWP of the first cell. Correspondingly, that a monitoring occasion of a wake-up signal exists in a first time window includes: a monitoring occasion of a wake-up signal configured in a BWP of a second cell exists in the first time window; and the sending unit 1002 is configured to: send the physical downlink control channel within an on duration time period of a DRX state configured in the BWP of the second cell.

All related content of the steps in the foregoing method embodiment may be cited in functional descriptions of the corresponding functional modules. Details are not described herein again.

Based on a same technical concept, an embodiment of the present invention further provides a communications apparatus. The communications apparatus is, for example, a terminal device. The communications apparatus has functions of implementing the terminal device in the method designs. The functions may be implemented by hardware, or may be implemented by hardware executing corresponding software. The hardware or the software includes one or more units corresponding to the foregoing functions.

Figure 20:
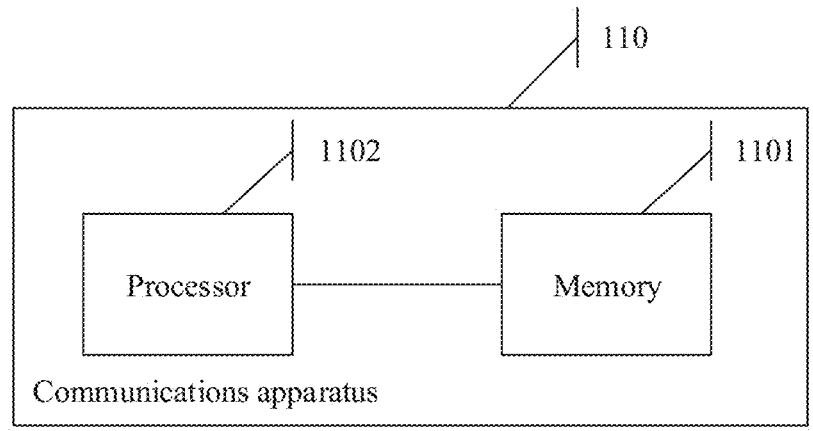
FIG. 20 is a schematic structural diagram of another communications apparatus according to an embodiment of the present invention.

For example, referring to FIG. 20, a specific structure of the communications apparatus 110 may include a memory 1101, configured to store a computer program; and a processor 1102, configured to execute the computer program stored in the memory 1101, so that the apparatus performs the communication method described in any one of the foregoing method embodiments applied to a terminal device or a network device.

Based on a same technical concept, an embodiment of the present invention further provides a communications device. The communications device is, for example, a terminal device. The communications device has functions of implementing the terminal device in the method designs. The functions may be implemented by hardware, or may be implemented by hardware executing corresponding software. The hardware or the software includes one or more units corresponding to the foregoing functions.

Figure 21:
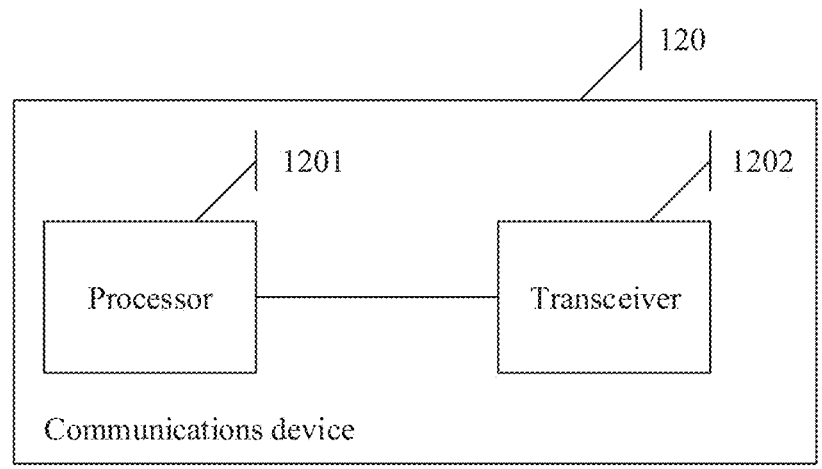
FIG. 21 is schematic structural diagram of a communications device according to an embodiment of the present invention.

For example, referring to FIG. 21, a specific structure of a communications device 120 may include a processor 1201, and optionally, may further include a transceiver 1202. The processor 1201 and the transceiver 1202 may perform the communication method described in any one of the foregoing method embodiments applied to a terminal device or a network device.

It should be noted that, the processor in the embodiments of this application may be an integrated circuit chip, and has a signal processing capability. In an implementation process, the steps in the foregoing method embodiments may be completed through a hardware integrated logical circuit in the processor or an instruction in a form of software. The processor may be a general-purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logic device, a discrete gate or transistor logic device, or a discrete hardware component. The processor may implement or perform the methods, the steps, and logical block diagrams that are disclosed in the embodiments of this application. The general-purpose processor may be a microprocessor, or may be any conventional processor or the like. Steps of the methods disclosed with reference to the embodiments of this application may be directly executed and accomplished through a hardware decoding processor, or may be executed and accomplished through a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in the embodiments of this application may be a volatile memory or a nonvolatile memory, or may include both a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM) that is used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory of the systems and methods described in this specification includes but is not limited to these and any memory of another proper type.

Based on a same technical concept, an embodiment of the present invention further provides a computer-readable storage medium, including a program or an instruction. When the program or the instruction is run on a computer, the communication method described in any one of the foregoing method embodiments applied to a terminal device or a network device is performed.

Based on a same technical concept, an embodiment of the present invention further provides a chip. The chip is coupled to a memory, and is configured to read and execute a program instruction stored in the memory, to implement the communication method described in any one of the foregoing method embodiments applied to a terminal device or a network device.

Based on a same technical concept, an embodiment of the present invention further provides a computer program product including an instruction. When the computer program product runs on a computer, the computer is enabled to perform the communication method described in any one of the foregoing method embodiments applied to a terminal device or a network device.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by the computer or the processor of the any other programmable data processing device generate an apparatus for implementing a specific function in one or more processes in the flowcharts and/or in one or more blocks in the block diagrams.

These computer program instructions may be stored in a computer-readable memory that can instruct the computer or the another programmable data processing device to work in a specific manner, so that the instructions stored in the computer-readable memory generate an artifact that includes an instruction apparatus. The instruction apparatus implements the specific function in one or more processes in the flowcharts and/or in one or more blocks in the block diagrams.

These computer program instructions may be loaded onto the computer or the any other programmable data processing device, so that a series of operations and steps are performed on the computer or the any other programmable device, thereby generating computer-implemented processing. Therefore, the instructions executed on the computer or the any other programmable device provide steps for implementing a specific function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Definitely, persons skilled in the art can make various modifications and variations to the embodiments of the present invention without departing from the spirit and scope of the embodiments of the present invention. In this way, the present invention is intended to cover these modifications and variations provided that these modifications and variations of the embodiments of the present invention fall within the scope of the claims and equivalent technologies of the claims of the present invention.

What is claimed is:

1. A communication method, wherein the method comprises:
   receiving, from a network device, configuration information indicating at least one search space set for a terminal device;
   determining, in the at least one search space set, one or more monitoring occasions for sending a wake-up signal (WUS);
   determining a time window for monitoring the WUS; and
   in response to determining that the one or more monitoring occasions for sending the WUS are outside of the time window, detecting a physical downlink control channel within an on duration time period of a discontinuous reception (DRX) state, wherein the time window is prior to the on duration time period, and wherein the WUS indicates the terminal device to monitor the physical downlink control channel within the on duration time period.

2. The method according to claim 1, wherein the wake-up signal is a user equipment-specific physical downlink control channel wake-up signal (UE-specific PDCCH WUS) or a group-based wake-up signal (group-based WUS).

3. The method according to claim 1, wherein the at least one search space set and the time window are configured independently.

4. The method according to claim 1, wherein the length of one of the at least one search space set is longer than the length of the time window.

5. The method according to claim 1, wherein the one or more monitoring occasions are one or more symbols located in one or more slots for sending the WUS.

6. A communication apparatus, comprising:
   at least one processor configured to perform operations comprising:
   receiving, from a network device, configuration information indicating at least one search space set for a terminal device;
   determining, in the at least one search space set, one or more monitoring occasions for sending a wake-up signal (WUS);
   determining a time window for monitoring the WUS; and
   in response to determining that the one or more monitoring occasion for sending the WUS are outside of the time window, detecting a physical downlink control channel within an on duration time period of a discontinuous reception (DRX) state, wherein the time window is prior to the on duration time period, and wherein the WUS indicates the terminal device to monitor the physical downlink control channel within the on duration time period.

7. The apparatus according to claim 6, wherein the wake-up signal is a user equipment-specific physical downlink control channel wake-up signal (UE-specific PDCCH WUS) or a group-based wake-up signal (group-based WUS).

8. The apparatus according to claim 6, wherein the at least one search space set and the time window are configured independently.

9. The apparatus according to claim 6, wherein the length of one of the at least one search space set is longer than the length of the time window.

10. The apparatus according to claim 6, wherein the one or more monitoring occasions are one or more symbols located in one or more slots for sending the WUS.

11. A communication method, wherein the method comprises:
    sending, to a terminal device, configuration information of at least one search space set for the terminal device;
    determining, in the at least one search space set, one or more monitoring occasions for the terminal device to send a wake-up signal (WUS);
    determining a time window for monitoring the WUS; and
    in response to determining that the one or more monitoring occasions are outside of the time window, sending a physical downlink control channel within an on duration time period of a discontinuous reception (DRX) state, wherein the time window is prior to the on duration time period, and wherein the WUS indicates the terminal device to monitor the physical downlink control channel within the on duration time period.

12. The method according to claim 11, wherein the wake-up signal is a user equipment-specific physical downlink control channel wake-up signal (UE-specific PDCCH WUS) or a group-based wake-up signal (group-based WUS).

13. The method according to claim 11, wherein the one or more monitoring occasions are one or more symbols located in one or more slots for sending the WUS.

14. The method according to claim 11, wherein the at least one search space set and the time window are configured independently.

15. The method according to claim 11, wherein the length of one of the at least one search space set is longer than the length of the time window.

16. A communication apparatus, comprising:
at least one processor configured to perform operations comprising:
sending, to a terminal device, configuration information of at least one search space set for the terminal device;
determining, in the at least one search space set, one or more monitoring occasions for the terminal device to send a wake-up signal (WUS);
determining a time window for monitoring the WUS; and
in response to determining that the one or more monitoring occasions are outside of the time window, sending a physical downlink control channel within an on duration time period of a discontinuous reception (DRX) state, wherein the time window is prior to the on duration time period, and wherein the WUS indicates the terminal device to monitor the physical downlink control channel within the on duration time period.

17. The apparatus according to claim 16, wherein the wake-up signal is a user equipment-specific physical downlink control channel wake-up signal (UE-specific PDCCH WUS) or a group-based wake-up signal (group-based WUS).

18. The apparatus according to claim 16, wherein the one or more monitoring occasions are one or more symbols located in one or more slots for sending the WUS.

19. The apparatus according to claim 16, wherein the at least one search space set and the time window are configured independently.

20. The apparatus according to claim 16, wherein the length of one of the at least one search space set is longer than the length of the time window.

* * * * *